(12) United States Patent  
Xiang et al.

(10) Patent No.: US 9,612,059 B2  
(45) Date of Patent: Apr. 4, 2017

(54) SYSTEMS AND METHODS OF THERMAL TRANSFER AND/OR STORAGE

(75) Inventors: XiaoDong Xiang, Danville, CA (US); Rong Zhang, Cupertino, CA (US)

(73) Assignee: Bluelagoon Technologies Ltd., Saratoga, CA (US)

( * ) Notice: Subject to any disclaimer, the term of this patent is extended or adjusted under 35 U.S.C. 154(b) by 1548 days.

(21) Appl. No.: 12/885,411

(22) Filed: Sep. 17, 2010

(65) Prior Publication Data

US 2011/0120673 A1 May 26, 2011

Related U.S. Application Data

(60) Provisional application No. 61/276,885, filed on Sep. 17, 2009.

(51) Int. Cl.  
F28D 15/00 (2006.01)  
F28D 15/02 (2006.01)  
(Continued)

(52) U.S. Cl.  
CPC ............. F28D 15/02 (2013.01); C09K 5/063 (2013.01); C09K 5/10 (2013.01); C09K 5/12 (2013.01);  
(Continued)

(58) Field of Classification Search  
CPC .. F25D 11/006; Y02E 60/142; F28D 20/2021; F28D 20/02; F28D 20/023;  
(Continued)

(56) References Cited

U.S. PATENT DOCUMENTS 4,159,289 A * 6/1979 Anderson ................. C07F 9/20  
558/112  
4,263,961 A * 4/1981 Morawetz ............... C09K 5/06  
126/644  
(Continued)

FOREIGN PATENT DOCUMENTS

WO WO/2011/035213 3/2011

OTHER PUBLICATIONS

PCT International Search Report and Written Opinion dated Jun. 28, 2011 issued in PCT/US2010/049406.  
(Continued)

*Primary Examiner* — Allana Lewin Bidder  
*Assistant Examiner* — Kun Kai Ma  
(74) *Attorney, Agent, or Firm* — Tom Hunter; Weaver Austin Villeneuve & Sampson LLP

(57) ABSTRACT

Systems, methods, and computer-implemented embodiments consistent with the inventions herein are directed to storing and/or transferring heat. In one exemplary implementation, there is provided a system for transferring/storing heat comprised of a heat exchange/storage apparatus including a chamber, and a heat input device adapted to heat/provide a vapor into the chamber. Other exemplary implementations may include one or more features consistent with a heat output device through which a working medium/fluid passes, a thermal storage medium located within the chamber, and/or a heat exchange system that delivers a heat exchange medium/fluid to the thermal storage medium.

41 Claims, 12 Drawing Sheets

(51) Int. Cl.
*C09K 5/06* (2006.01)
*C09K 5/10* (2006.01)
*C09K 5/12* (2006.01)
*F01K 3/00* (2006.01)
*F24H 7/04* (2006.01)
*F28D 20/00* (2006.01)
*F28D 20/02* (2006.01)

(52) U.S. Cl.
CPC .............. *F01K 3/004* (2013.01); *F01K 3/008* (2013.01); *F24H 7/0433* (2013.01); *F28D 20/00* (2013.01); *F28D 20/02* (2013.01); *F28D 20/023* (2013.01); *F28D 20/026* (2013.01); *F28D 20/028* (2013.01); *F24D 2220/10* (2013.01); *F24H 2240/127* (2013.01); *F28D 2020/006* (2013.01); *F28D 2020/0021* (2013.01); *F28D 2020/0047* (2013.01); *F28D 2020/0082* (2013.01); *F28F 2265/26* (2013.01); *Y02B 10/20* (2013.01); *Y02E 60/142* (2013.01); *Y02E 60/145* (2013.01)

(58) Field of Classification Search
CPC ...... F28D 20/021; F28D 20/028; F28D 20/00; F28D 15/02; F28D 2020/006; F28D 2020/0021; F28D 2020/0086; F24D 2220/10; F24H 7/0433
USPC .................. 62/430; 165/10, 104.25
See application file for complete search history.

(56) References Cited

U.S. PATENT DOCUMENTS

| | | | | |
|---|---|---|---|---|
| 4,458,669 A * | 7/1984 | Lee | ............................... | 126/618 |
| 4,466,478 A | 8/1984 | Carlsson et al. | | |
| 4,509,344 A * | 4/1985 | Ludwigsen | ............... | F25C 1/00 |
| | | | | 165/104.17 |
| 4,535,837 A | 8/1985 | Ishii et al. | | |
| 4,696,338 A * | 9/1987 | Jensen | ................. | F28D 20/025 |
| | | | | 165/10 |
| 4,708,849 A * | 11/1987 | Mielnik, Jr. | .............. | A23L 3/10 |
| | | | | 122/406.1 |
| 4,821,794 A | 4/1989 | Tsai et al. | | |
| 4,864,831 A * | 9/1989 | Hino | ...................... | F24F 5/0017 |
| | | | | 62/123 |
| 4,894,077 A * | 1/1990 | Simon | ..................... | F25D 16/00 |
| | | | | 62/434 |
| 5,038,850 A * | 8/1991 | Choi | .............................. | 165/10 |
| 5,409,676 A | 4/1995 | Nasako et al. | | |
| 5,658,324 A * | 8/1997 | Bailey, Sr. | ................ | A61F 7/10 |
| | | | | 607/104 |
| 6,059,016 A * | 5/2000 | Rafalovich | ......... | B60H 1/00492 |
| | | | | 165/10 |
| 6,116,330 A * | 9/2000 | Salyer | ................... | F28D 20/023 |
| | | | | 165/10 |
| 7,316,262 B1 * | 1/2008 | Rini | ...................... | F28D 20/023 |
| | | | | 165/10 |
| 7,641,715 B2 * | 1/2010 | Py | .......................... | B01D 53/02 |
| | | | | 502/400 |
| 8,171,984 B2 * | 5/2012 | Christ | .................... | C09K 5/063 |
| | | | | 165/10 |
| 2002/0108745 A1 | 8/2002 | Kimura | | |
| 2008/0272331 A1 * | 11/2008 | Mohapatra et al. | ............ | 252/70 |
| 2009/0211249 A1 * | 8/2009 | Wohrer | ..................... | F01K 3/00 |
| | | | | 60/641.8 |
| 2009/0250189 A1 | 10/2009 | Soukhojak et al. | | |
| 2011/0162829 A1 | 7/2011 | Xiang | | |
| 2012/0241122 A1 | 9/2012 | Xiang et al. | | |

OTHER PUBLICATIONS

PCT International Preliminary Report on Patentability dated Mar. 20, 2012 issued in PCT/US2010/049406.
US Office Action dated Nov. 22, 2013 issued in U.S. Appl. No. 12/916,539.
US Final Office Action dated Jul. 14, 2014 issued in U.S. Appl. No. 12/916,539.
US Office Action dated Sep. 25, 2015 issued in U.S. Appl. No. 12/916,539.
US Office Action dated May 27, 2016 issued in U.S. Appl. No. 12/916,539.

* cited by examiner

SYSTEMS AND METHODS OF THERMAL TRANSFER AND/OR STORAGE

This application claims benefit/priority to U.S. provisional application No. 61/276,885 filed Sep. 17, 2009, which is incorporated herein by reference in entirety.

FIELD

Aspects of the innovations herein relate to heat exchange and/or thermal energy storage methods and apparatus. More specifically, exemplary innovations relate to the application of phase change materials (PCMs) as thermal energy storage materials and/or heat exchange media.

BACKGROUND INFORMATION

Energy storage is important in many energy consumption applications, including conventional and renewable utility power generation, building air-conditioning and heating, and industry process heating. For example, nuclear and coal-fired power plant need to shift their generated power during low demand hours to peak demand hours of the grid; wind power and solar power plants need even more energy storage solution since their energy resources are more uncontrollable to meet the grid demand.

Direct electric energy storage requires batteries. Although there are continued efforts to improve battery technologies, their intrinsic high cost nature limits their applications to small scale emergency power supplies. Hydroelectric and compressed air solutions are two current applicable solutions, where electricity is first converted to potential energy of water or air by pumps and compressors, and then converted back to electricity when needed. However, these two solutions all require special geologic conditions, i.e. geologic conditions to build two low and high attitude water reservoirs or natural underground air-tight high pressure air-reservoir, which are rarely available in local power plants.

Thermal energy storage, however, is intrinsically low cost, due to availability of various low cost materials for the application. Since most of power plants (more than 80%) generate electricity through thermal process, thermal energy storage can be conveniently applied to utility power generation.

In the field of electricity generation, most power plants use Steam Turbines as driving engines for electricity generation. Steam Turbines work on the principle of the Rankine cycle, such as via turbine blades that are driven by expansion of overheated steam. The efficiency is determined by the pressure ratio of steam at entry and outlet. To increase the efficiency, the steam at the outlet needs to be condensed, most often by cooling water. In this process, large amount of latent heat, usually 60% of total thermal energy at entry has to be released from the low pressure steam at the outlet, e.g., dumped into cooling water and dissipated to the environment. For one ton of steam, this cooling process requires 50 to 100 tons of fresh water, which consume 5 to 10% of electricity for the pumps to perform water circulation and 5 to 10 tons of water loss in water tower cooling process. If the water source is not free, the cost of electricity and water will consist 20-30% of total operating cost. As a result, power plants cannot be built at any location even if other environmental effects are not considered. Similar cooling process is also required for large scale refrigeration and desalination process. In these processes, water cooling operation cost also composed of large percentage of the total operating cost.

These are great needs to eliminate water cooling while maintaining the efficiency of electricity generation, refrigeration, and desalination from both environmental and economic grounds. In the past, air-cooling methods have been tried, however, not very successfully due to expensive equipment and the high electricity consumption involved. If the residual heat at the outlet of a heat engine or appliances, such as Rankine cycle, heat pumps, desalination and refrigeration apparatus, can be stored during operation hour, then dissipated or used latter time, great amount of energy and water resources will be saved.

Thermal energy storage is also important to concentrated solar power (CSP) plants. The working principle of CSP is to use various forms of focusing mirrors, such as parabolic dish mirrors, parabolic trough mirrors, Fresnel mirrors, and other types of focusing mirrors to focus the solar light on the thermal collector, where special coating converts and light into thermal energy; thermal power heats up the heat transfer fluid (HTF) which flows through the thermal collector to a certain temperature, then generates high pressure high temperature steams via heat exchanger to drive the steam turbine for the electricity generation. In other words, CSP uses a solar boiler to replace a regular fossil fuel or nuclear fuel boilers, keeping other portions of conventional power plant unchanged.

However, the unstable nature of solar radiation, caused either by clouds or sunset, requires a thermal storage sub-system in CSP plants in order to qualify them as a base load power supplier. Therefore, a low cost and highly efficient thermal storage solution becomes a key for CSP plants to be deployed in large scale to replace fossil fuel power plants. For example, for a given parabolic trough CSP power plant, without thermal storage sub-system, its annual operation coefficient will be about 20%, i.e., 1760 operation hours per year; if a thermal storage sub-system is used, the operating coefficient can be increased to more than 60% or 5260 operation hours per year.

For thermal storage applications, there are three key thermal media: heat transfer fluid (HTF), thermal storage medium, and working medium. HTF's transfer the heat from heat generator or collector to thermally charge storage medium or directly heat working medium through exchanger; storage media receive the heat from HTF and deliver the heat to the working medium through heat exchanger; and the working medium receives the heat from heat exchanger and drives the heat engine.

HTF can either be a gas or liquid. There are mainly two types of liquid HTF: one is heat conducting oil and the other molten salt. Normally, the highest temperature conducting oil can sustain is about 400° C. Above this temperature, the conducting oil will decompose. Molten salt, on the other hand, can sustain up to 600° C. temperature, however, has to be kept at higher than 220° C. all the time in order to avoid solidification and subsequent damage to the transport pipes and containers. This requirement normally causes higher system maintenance costs. For gas type HTF, steam can be used, however, pressure and cost will be too high for high temperature steam; hot air can be used with a very low heat capacity and high electricity consumption to create high flow rate.

In most cases, the working medium is a liquid, such as water, which was pre-pressurized to a desired working pressure, then heated to the desired working temperature via a heat exchanger, and finally released under pressure to undergo a liquid-gas phase transition. High pressure vapor at the heat engine entry will expand, and during the process, the potential energy of pressurized molecule transform to kinetic energy due to the high speed gained during the expansion. This kinetic energy is the driving force of the heat engine for the mechanical work and, finally, electricity generated. For example, for a typical 1 MW steam turbine, it requires 2.4 MPa pressure at 355° C. temperature to achieve highest efficiency. For a typical 100 MW steam turbine, the required steam pressure and temperature will be 10 to 12 MPa at 380 to 400° C. temperature range. Large size steam turbines can usually achieve higher conversion efficiency from thermal energy to electricity, but in order to achieve this, they also require steam of higher pressure and temperature.

Two techniques to store thermal energy based on the types of heat absorbed in materials include methods of sensible heat and methods of latent heat.

Sensible heat storage mechanisms may be based on the specific heat capacity of the storage medium, wherein the charging and discharging of thermal energy to and from the storage medium may be realized by increasing or decreasing the temperature of the materials: $Q=MC_p(T_2-T_1)=MC_p\Delta T$ (Eq. 1), Where Q is the sensible heat stored in, M the mass, $C_p$ specific heat capacity of the storage medium, $T_1$ and $T_2$ starting and ending temperatures, $\Delta T$ the temperature difference.

Sensible heat storage is the most common, simple, mature and widely used thermal storage method. It can be further classified into four different methods: liquid, solid, liquid and solid mixed, and pressurized vapor sensible heat storage.

Liquid-phase sensible heat thermal storage. Liquid phase sensible heat thermal storage devices normally use either director indirect heat exchange methods. Here, for example, CSP solar collecting field, such as parabolic trough or linear Fresnel mirrors, normally use conducting oil (mineral oil or synthetic oil) as its HTF while using molten salt as liquid phase sensible heat thermal storage material. Liquid-phase sensible storage materials are most often used in so called "Active Thermal Energy Storage" system, where storage materials circulate through heat exchangers and collectors. In this way, one needs to use a heat exchanger to transfer thermal energy from conducting oil to molten salt to store the thermal energy. Therefore, this method is called indirect thermal storage. Currently, most distributed solar thermal collecting fields (such as parabolic dish, parabolic trough, and linear Fresnel CSP) use such methods, which are the only commercialized mature thermal energy storage method. Typically, two tanks are used, one for the high temperature molten salt and the other one for the low temperature molten salt. During thermal energy storage time, the high temperature conducting oil will heat up the low temperature molten salt when it flows from low temperature container to high temperature container via a heat exchanger to transfer thermal energy from high temperature conducting oil to molten salt, while the high temperature molten salt will be stored in the high temperature container. When solar energy is not available, the high temperature molten salt will flow into low temperature container via a heat exchanger to generate high temperature high pressure steam for continuous electricity generation. This process comes to an end when most of the high temperature molten salt flow out from the high temperature container.

There are several problems with this approach: a) it requires several high temperature specialty pumps that can handle high temperature and very corrosive molten salt between the two containers, conducting oil-molten salt heat exchanger and molten salt-steam generation heat exchanger; b) it requires specialty heat exchanger due to the natures of molten salt; c) the construction cost is still quite high: for example, for large scale deployment, the thermal storage device construction cost can be $40/kWh of heat.

The two container molten salt solution can also become a direct thermal energy storage sub-system for a parabolic trough or tower CSP system. In these cases, the molten salt acts both as HTF for the solar collecting field and liquid phase sensible heat thermal storage material, i.e., HTF and sensible heat thermal storage material become the same material, no extra heat exchanger is involved, therefore, called direct thermal energy storage. Obviously, this approach avoids a heat exchanger, which will reduce thermal energy loss during the process. It is suitable for parabolic trough system works at 400-500° C. temperature range. The main shortcoming with this approach is that extra heating devices and energy are required to keep the molten salt temperature above 220° C., which is common molten salt's melting point, in order to avoid damage to the transport piping system during its solidifying process. For a distributed solar collecting field, this will significantly increase the complexity and the cost for the transport pipe, both in their construction and in their maintenance and services.

Tower CSP system can normally use direct liquid phase sensible heat thermal energy storage solution, such as in Spain Solar Tres tower CSP power plant. Because the transport piping system is vertically installed in the CSP tower, the liquid molten salt is easily discharged from the pipes so that the solidifying problem is not as severe as in the parabolic trough CSP system. In addition, since the working temperature of tower CSP is normally significantly higher than that of a parabolic trough CSP system, the sensible heat thermal storage approach is more suitable to the tower CSP than for the trough CSP. For proper liquid phase temperature range, normally a mixture of inorganic salts or a single phase compound is used in such application. For example, the Solar Two tower CSP at Nevada of US used 60% of sodium nitride and 40% of potassium nitride as a single phase compound; its melting point is 220° C. Its working temperature range is 300-600° C. The SEGS trough system that built at California desert of USA in the 1990s used therminol VP-1, Hitech (53% $KNO_3$+7% $NaNO_3$+40% $NaNO_2$ mixture) and Hitec XL (45% $KNO_3$+48% Ca $(NO_3)_2$+7% $NaNO_3$ mixture) as their direct liquid sensible heat thermal energy storage materials.

Solid state sensible heat thermal energy storage. Solid state sensible heat thermal energy storage uses rock, concrete, sand, etc. low cost solid state material as thermal storage media. Since the solid materials cannot be transported between containers for thermal energy transportation, a gas phase or liquid phase HTF also have to be used for heat exchange media between HTF, storage medium and working medium. This type of system also called "Passive Thermal Energy Storage" system. In direct steam generation CSP system, the thermal storage system normally uses solid state sensible heat thermal energy storage materials. The greatest advantage is low cost for storage materials. However, it can only be used in indirect thermal energy storage approach. Tamme from Germany Aero Space Center (DLR) studied and developed high temperature concrete and casting ceramic as solid state sensible heat thermal energy storage material based on the property study of sand-rock concrete and basalt concrete, where the frame for the high temperature concrete is ferric oxide, the cement acts as filling material. However, a disadvantage of solid state sensible storage method is that the heat exchange and working temperature decrease during discharge, since sensible storage materials temperature decreases as thermal energy decreases. Another problem is the thermal conductivity and heat transfer is low. Also if direct generated steam is used for the HTF, as it currently is, this requires the transport piping system to cross the entire solar collecting field and the thermal storage containers to sustain high temperature and high pressure. This will dramatically increase the cost for such steam transport as well as the thermal storage container cost. On the other hand, to reduce the cost, the pressure of the directly generated steam has to be lowered, which will decrease the working efficiency for steam turbine. As consequence, this approach has been researched for a long time without necessary breakthroughs.

Liquid-solid combined sensible heat thermal energy storage. Liquid-solid state combined sensible heat thermal energy storage approaches use some solid state materials and HTF that is compatible at high temperature so that the solid state material and the HTF can be combined together to increase the heat capacity for the combined thermal storage system. One of the obvious advantages of using solid state material in thermal storage is to significantly reduce the usage of HTF while keeping the total amount of thermal storage unchanged so that the thermal storage cost can be lowered (in general, solid state material is much lower than that of HTF. In order to reduce the equipment investment cost for the two tank liquid phase molten salt thermal energy storage system, James from Sandia National Laboratory designed and tested a thermocline tank storage system with 2.3 MWh. The thermocline tank storage system utilizes thermocline layer formed due to natural temperature cline distribution based on the relationship between thermal storage material density and the temperature. This thermocline layer is formed when there is a temperature difference appears between the top (high temperature portion) and the bottom (the low temperature portion). This thermocline layer acts as an insulation layer so that the molten salt on its top can keep at higher temperature and the molten salt on its bottom can keep at lower temperature. During thermal storage period, the thermocline layer moves to upper direction. During thermal energy release period, the thermocline layer moves to lower direction. In this way, it can keep the output molten salt at a constant temperature. When the thermocline layer reaches the top of the tank or to the bottom of the tank, the temperature of the output molten salt will change dramatically. In order to maintain the temperature layer gradient, one needs to strictly control the amount of input and output molten salt, as well as properly arranges solid state filling material into layered structure, paired with floating inlet and ring-shell heat exchanger devices. Although this approach may reduce the thermal storage cost by 35% comparing with previously described liquid phase sensible heat thermal energy storage system, it still has the similar shortcomings mentioned before.

Pressurized water (steam) thermal energy storage. The CSP power plant of Planta Solar 10 at Seville of Spain uses pressurized steam at 285° C. with 4 MPa pressure to store the thermal energy. PS10 is the first tower CSP project in Spain. It needs high pressure container to store the pressured high temperature water directly flowed from heat source or collector through high pressure pipes. This thermal storage approach can only used to smooth the solar radiation intensity fluctuations during the day, which can provide 1 hour of steam to the turbine generator. When the pressured high temperature water is released from the storage vassal, it undergoes liquid-gas phase transition as the pressure is slightly reduced. The high pressure steam can be used directly to drive steam turbine. Strictly speaking, the stored energy here is still sensible heat from high pressure water, not latent heat which only exists upon liquid-gas phase transition outside the storage tank. It is an effective method to provide balance load for steam turbine. However, due to high cost of pressurized vessels, this approach is very hard to be deployed in large scale.

Working medium absorbs most energy near the working temperature, i.e. the temperature at the entry of the heat engine. This is due to large latent heat absorbed at liquid to gas phase transition or large heat capacity of the medium near critical point where all liquid turns into gas phase regardless of the pressure. As the consequence, sensible heat storage medium has to provide all needed thermal energy at this temperature. In order to do this, sensible heat storage medium needed to be charged to a much higher temperature according to the Eq. 1. Since the thermal energy required of working medium near working temperature is about a few hundred times higher than the heat per degree of the sensible heat storage materials, $T_2$ has to be a few hundred degree higher than working temperature of the working medium, or the mass and flow rate of sensible thermal storage materials and HTF have to be hundreds time higher than working medium, which is unrealistic and high cost. This requirement presents many challenges to the sensible thermal storage system: (1) heat loss in transfer pips and storage container, as well as in collector if the heat is from solar energy will be very high due to thermal radiation and convention, and difficult to control to a tolerable level; (2) it requires the HTF also work at this higher temperature. Usually the tolerable working temperature of HTF limits the $_{T2}$ and in turn limits the working temperature of the working medium. Low working temperature of the working medium will result a low efficiency of the heat engine.

To match the large thermal energy demand near the working temperature of the working medium, it is desirable to have a phase change material with transition temperature at the working temperature as the thermal storage medium, who's large latent heat absorbed or released at the phase transition matches the demand. Furthermore, to provide storage medium of such large amount of heat, it is also desirable to have HTF also to be a phase change materials, otherwise a very large flow rate (100 times larger than the flow rate of working medium) has to be adopted for HTF; or have a very high working temperature for HTF.

Latent heat storage mechanism utilizes the heat associate with materials physical state change, such as liquid to gas, solid to liquid, solid crystalline phase to phase transition. Latent heat associate with the transition has much higher effective specific heat capacity within transition than that of sensible heat storage materials. Heat absorbed or released at the transition is described by: $Q=MC_p(\text{eff})\delta T$ (Eq. 2), where M is the mass of the materials and $C_p(\text{eff})$ the effective heat capacity within phase transition, $\delta T$ temperature difference within transition range. Latent heat storage matches the heat demand of working medium near working temperature, lowers the required working temperature of HTF and heat collectors, therefore heat loss; and improves the efficiency of the heat engine. However, liquid-gas phase change latent heat storage is difficult to use due to extremely large volume change at the phase change. Water, for instance, expands 1600 times when it vaporizes at 0.1 MPa pressure (one atmosphere). Therefore, it is not economical to utilize latent heat for thermal energy storage with liquid-gas phase transition, because a large container with very high pressure inside the storage container is required to accommodate the gas phase volume, resulting significantly reduced thermal energy storage density and difficult mechanical structure design for the thermal storage apparatus.

In Europe, 13 countries proposed a design of PCM storage system, referred to as the DISTOR project. In this project, direct generated steam or (high pressure water) is used as HTF, and graphite and PCM micro-encapsulated compound storage materials are used. Other methods involve mixed PCMs have also been proposed. In such previous proposals, heat exchange between HTF/WF and storage materials are shell-piping heat exchanger, where HTF/WF flow in piping and PCMs surround piping inside the tank with solid filling materials to improve the thermal contact.

Although there are many studies on PCM thermal storage, there are still major difficulties of using solid-liquid phase change materials (PCM) as latent heat storage. The first is that PCM volume changes during phase transition. The volume change makes mechanical system design considerably difficult. The second is difficult to maintain a good heat conduction between solid-liquid PCMs and HTF. Heat transfer between the storage medium, HTS and working medium has not been solved properly, as the result, no commercial application of latent heat storage method and apparatus have been succeeded so far.

There is, therefore, a need to overcome the shortcomings of the current thermal energy transfer/storage method.

SUMMARY

Systems, methods, and computer-implemented embodiments consistent with the inventions herein are directed to transferring and/or storing heat.

In one exemplary implementation, there is provided a system for transferring/storing heat comprised of a heat exchange/storage apparatus including a chamber, a heat output device through which a working medium/fluid passes, a heat input device adapted to heat/provide a vapor into the chamber, a thermal storage medium located within the chamber, and a heat exchange system that delivers a heat exchange medium/fluid to the thermal storage surfaces.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

DESCRIPTION OF THE DRAWINGS

The accompanying drawings, which constitute a part of this specification, illustrate various implementations and aspects of the present invention and, together with the description, explain the principles of the invention. In the drawings.

DETAILED DESCRIPTION

Figure 1:
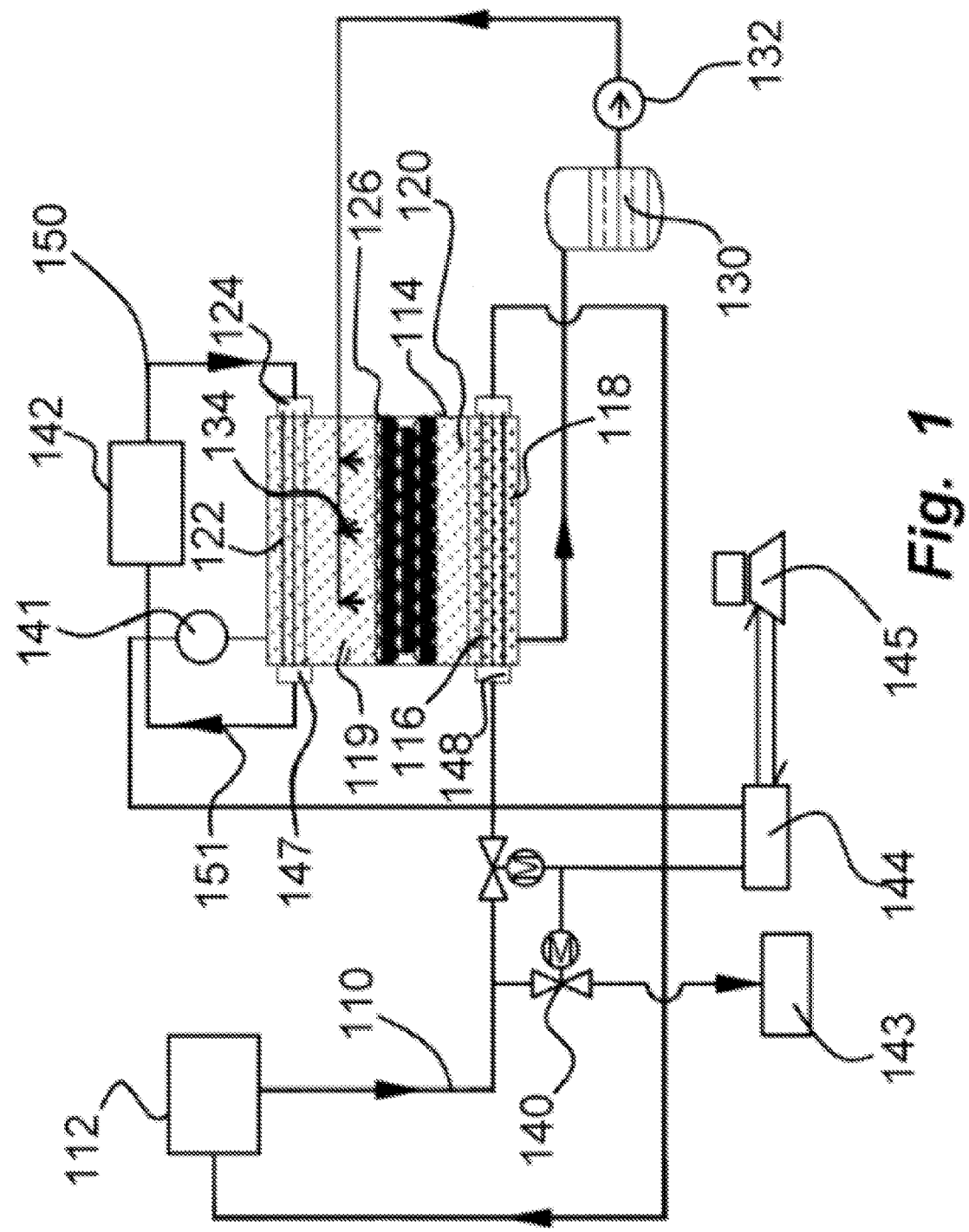
FIG. 1 is a block diagram of an exemplary system consistent with certain aspects related to the innovations herein.

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Aspects of the innovations, such as those set forth in some of the implementations below, may relate to systems and methods of integrating an evaporation-condensation heat exchange mechanism with a phase change latent heat energy storage apparatus, using liquid-gas phase change materials as heat exchange media and solid-liquid phase change materials as thermal energy storage media. However, it should be understood that the inventions herein are not limited to any such specific illustrations, but are defined by the scope of the claims and full disclosure.

According to some exemplary implementations, a PCM heat exchange and thermal storage apparatus may comprise the following components: a main container, an input heat transfer device which transports HTF and its heat into the container, an output heat transfer device which transports working medium and its thermal energy out of the container, at least one type solid-liquid PCM packaged inside secondary containers acting as thermal storage medium, a liquid-gas PCM, contained by the main container, not piping inside the main container, acting as heat exchange medium between surfaces that confine the HTF, storage medium and working medium, a circulating/showering system for liquid-gas PCM, and a pressure regulating system to control the vapor pressure of liquid-gas PCM.

Liquids with large temperature span, such as water, synthetic oils, ionic fluids, or molten salts may be used as the HTF for thermal energy input. Working fluids (WFs), which may be water, though can also be ammonia, organic solutions, and many other choices of liquid with desired properties, are typically used for thermal energy output. Examples of such fluid are set forth in Table 1. Further, Solid-liquid phase PCM storage materials can be many choices of inorganic and organic PCM materials with desired transition temperature and effective heat capacity. Examples of such PCMs are set forth in Table 2 for low phase transition temperatures and Table 3 for high phase transition temperatures. Solid-liquid PCMs are usually packaged in secondary containers, in desired shapes and sizes, and positioned on layered shelves in the main container. Liquid-gas PCM heat exchange media can be many choice of liquids with desired liquid-gas phase transition and vapor pressure at the working temperature, and they may be the same materials as the HTFs or WFs, as set forth in Table 1.

Two main methods can be used to effectively transfer the thermal energy into the container, between the HTF, the storage medium and the WF, and out of the container.

According to exemplary implementations of a first method, a small amount liquid-gas PCM is positioned at the container bottom, in physical contact with input heat transfer device in "pool boiling" condition. Application of heat in the HTF via the input heat transfer device then quickly brings the liquid-gas PCM to evaporation state, transferring its thermal energy into latent heat, e.g., of gas state of a liquid-gas PCM, given that the HTF is at a significantly higher temperature than the boiling point of liquid-gas PCM at a given pressure in the container. In this case, the amount of liquid-gas PCM in the container is small so that it is easily to be heated up to desirable temperature so that most of PCM is evaporated. The working temperature of the heat exchange container is determined by boiling point of liquid-gas PCM at a given pressure in the container. For example, using VP-1 synthetic oil as HTF, its boiling temperature at 0.1 MPa (or about one atmosphere pressure) is 257° C. If temperature increases to 320° C., its corresponding saturated vapor pressure is 0.36 MPa.

As soon as liquid-gas PCM vapor in contact with the surfaces of secondary containers of solid-liquid PCM storage medium and/or the output heat transfer device (with, e.g., a WF flowing inside), vapor phase of PCM condenses into liquid phase, transferring its latent heat at an extremely high rate (supper-exchange) to the storage medium and/or WF that brings the thermal energy out of heat exchanger. Almost all of the condensation latent heat energy is instantly transferred from "hot" surfaces to the "cold" surfaces, making a very effective heat exchange system. In the process of transfer latent heat into the solid state thermal storage materials or WF, the condensation liquid droplets falls back to the bottom of the container by gravity force to re-start the heat transfer cycle, so that the entire system becomes an extremely efficient heat exchanger and thermal storage system. Note, the storage materials here are not in direct contact with the heat input and output piping surface, as with existing systems and methods.

In the second method, a HTF evaporation process is used. In exemplary implementations, here, the HTF and heat exchange media are the same liquid-gas PCM. Such HTF evaporation processes may comprise partial vaporization of HTF that occurs when a saturated liquid stream of HTF undergoes a reduction in pressure by passing through a throttling valve or other throttling device before entering the main container. When this partial vapor carrying the latent heat in physical contact with the surfaces of solid state and/or containers of solid-liquid phase change thermal storage materials, and WF via output heat transfer devices, the condensation process of the partial vapor transfers the latent heat of liquid-gas PCM vapor to thermal storage materials and/or WF.

In an exemplary evaporation implementation, i.e. where the fraction of evaporation from the flash process is determined by the phase change and thermal dynamics for the PCM at the flash temperature, if 400 C VP-1 is flashed into 380 C chamber, the vapor fraction after the flash process may be 23% with the remaining 77% maintaining a liquid state at temperature of 380 C. The 380 C vapor will transfer its latent heat to either WF via heat transfer output device or a solid-liquid PCM material via condensation process. The 380 C VP-1 can flash into a second container at lower temperature, for example flash into 280 C with 30% becomes vapor state.

Turning back to the general system, in both cases, a circulating/showering system continuously supply liquid PCM to the surface of secondary containers of storage PCM, and transfer heat from storage material to WF even if there no input HTF flow.

To control temperature in the container for a given container size, implementations herein may control the pressure by changing the ratio of vapor to liquid volumes using inert gas gas and liquid PCM reservoir control systems. For any given liquid-gas PCM, its vapor pressure and temperature have one to one relationship in a closed container. A liquid-gas PCM reservoir and circulating pump system are used to assure right amount of liquid phase for constant heat exchange.

The general principle of using gravity to circulate the evaporation and condensation process is commonly classified as two phase thermosiphons dates back to the steam age; this principle is widely used in one-dimensional thermosiphon device or heat pipe. The current invented heat exchange apparatus is effectively a three-dimensional thermosiphon device, where evaporation-condensation latent heat exchange process simultaneously occurring between more than one surfaces of secondary containers or piping of different media within a 3-dimensional maintainer. In the best of our knowledge, 3-dimensional thermosiphon device has not been disclosed in any prior art. Furthermore, in current invention, additional liquid circulating/showering system is added to assist heat transfer between storage PCM and WF when there is no heat input by HTF from the heat input device.

HTF temperature $T_1$, heat exchange medium temperature $T_2$, storage medium temperature $T_3$ and WF temperature $T_4$ have following relationship: $T_1 > T_2 > T_3 > T_4$, $\Delta T_{12} = T_1 - T_2$, $\Delta T_{23} = T_2 - T_3$, $\Delta T_{24} = T_2 - T_4$ $\Delta T_{12}$ and $\Delta T_{24}$ depend on flow rates of HTF and WF, physical structure of input and output heat transfer devices (mainly the heat transfer areas), thermal property of HTF and WF, and working pressure in the heat transfer container, which depends on the ratio of liquid to vapor volumes of liquid-gas PCM material in the heat exchange container. $\Delta T_{23}$ depends on the states of storage PCM materials within their secondary containers.

Effectively, inside heat exchange apparatus, the heat resistance is extremely small. Basically, heat conducting rate between relatively lower and higher temperature surfaces of input and output heat transfer devices and storage materials is extremely high, reaching about the 100 MW/m² level, as illustrated later in this disclosure. Therefore, this heat transfer process is also called a "thermal superconducting" process. Phase change temperatures of the liquid-gas PCMs can be tuned by controlling the liquid-gas PCM vapor pressure in the heat exchange/thermal storage container. The main function of the PCM liquid is to keep the temperatures of all the solid state thermal storage material surfaces the same as WF heat transfer device surfaces via "super heat conducting" mechanism, i.e., evaporation-condensation process. When there is no input heat energy from HTF, the circulating and a showering system are working to shower the liquid PCM on the surface of storage materials containers and transfer the latent heat to the WF. Although the liquid-gas PCM also stores the energy, it is miner comparing with those of solid state thermal storage materials due to limited amount of liquid-gas PCM in the thermal storage container.

Temperature of the vapor inside container is determined by the volume ratio between the liquid and the void volume for a given liquid-gas PCM. For example, if one fills a quantity of water equal to 5/1600 of the total void volume, the ultimate pressure in the heat exchange/thermal storage container will be five atmospheres, or 0.5 MPa. The corresponding ultimate temperature (liquid-gas phase change transition temperature at 5 atmospheres) will be 150 degree Celsius.

A series of this type of heat exchange/storage containers with different vaporization or heat exchange temperatures can then be stacked together with HTF and WF connecting pipes with weak thermal link between them.

In the following, we give a sample of solar thermal power plant application and related thermal dynamic analysis of using a 400° C. VP-1 as HTF, and "flash evaporate" at 370° C. to provide the thermal energy for pressurized working medium of water at 18.7 MPa to produce a saturated steam at 360° C. First we need to evaluate the change of entropy for the isolated system involved. The change of entropy is positive values: $\Delta S_{总} = 0.017708178$ for 370° C., therefore, do not violet the second law of thermal dynamics.

Table 4 lists two heat exchange/storage containers cascade breakdown of thermal energy or enthalpy differences needed to produce 1 ton of 360□ saturated steam. It also lists the corresponding VP-1 (HTF) flow needed to provide equivalent thermal energy to produce the saturated steam starting from 60□ water, which is the temperature of condensed water temperature at the outlet of steam turbine generator. Table 4 also list material composition and corresponding weight of PCM at each stage container to produce 1 ton of 360□ saturated steam. As indicated, the total PCM usage is 6.1 ton.

The entire thermal energy charging process works backward as follows: the thermal energy storage process can be divided into 2 different stages: in stage 1, 9.4 tons of the 400° C. HTF (VP-1) flash evaporate at 370° C. and releases part of its thermal energy (200 kWh) to match the thermal energy demand for 1 ton of pressurized (18.7 MPa) working medium of water at 360° C. to produce a saturated steam at 360° C. at 18.7 MPa; or charged into first stage of PCM thermal storage material, total of about 2 ton of NaOH (73.2%)+NaCl (26.8%) mixture with phase changing (PC) temperature at 370° C. and latent heat of 102.8 kWh/t; as illustrated in Table 4, the thermal load in stage 1 is 200 kWh.

In stage 2, 9.4 tones of the 370° C. (VP-1) flash evaporate at 304° C. and releases part of its thermal energy (420 kWh) to match the thermal energy demand of heating 1 ton of water from 60° C. to 360° C.; or charging second stage of PCM thermal storage material, 4.1 ton of same PCM as in the first stage.

When solar energy is not available, the stored thermal energy in the PCM will be released to continue to produce the saturated steam at 360° C. according to the method described above, i.e., spray VP-1 on to the surfaces of PCM packages, the VP-1 will be vaporized. The vaporized VP-1 will transfer the thermal energy from PCM to WF via evaporation and condensation process described before.

In summary, for each ton of 360□, 18.7 MPa saturated steam, we need to have total of 6.1 tons of PCM and 2 different storage containers to accommodate the needs. For a 50 MW CST system, the saturated steam load is about 150 ton per hour. If 6 hours of thermal storage is required, the total thermal storage requirement is to produce 900 tons of saturated steam. Considering 10% of thermal energy loss or other uncertainties, we should provide enough thermal storage to obtain 1000 tons of saturated steams when the thermal storage system is fully charged up. Therefore, 6100 ton of NaOH (73.2%)+NaCl (26.8%) mixture PCM thermal storage materials are needed.

Figure 13:
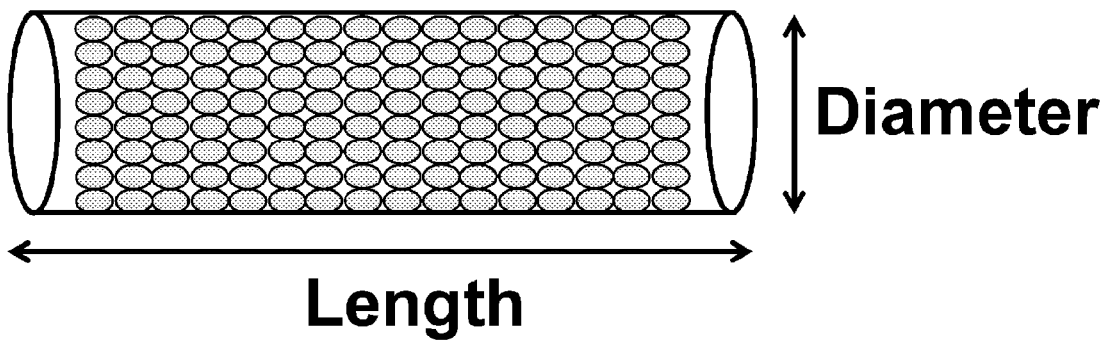
FIG. 13 illustrates, an exemplary implementation of thermal storage container's geometric configurations with PCM filled inside of secondary cylindrical pipes, consistent with certain aspects related to the innovations herein.

Following is a relationship between the ratio of pressurized container material price versus PCM price: $\alpha = Pg/Pp = (4/R + 4/L) \cdot d \cdot K$ (Eq. 3), where a is the ratio, Pg is the container material (most of time, boiler steel) price, Pp is the PCM price, R is the radius of the cylindrical container, L is the length of the cylindrical container, d is the thickness of the cylindrical container wall, K is a special ratio that represent the unit price ratio of the container material versus PCM, it is in the range of 15 to 20; This equation assumes that the void volume in the thermal storage container is about 50% of the total container volume. The wall thickness should not exceed 3 cm in most cases. Therefore, we have the following simplified relationship: $\alpha = Pg/Pp = 0.15319 + 2.16/R$, (Eq. 4). FIG. 13 illustrates such a relationship. This is to say that the larger the container's diameter is, the less cost of the thermal storage container. However, this diameter is also limited by the industrial safety standard, where the pressurized container cannot be too large.

According to the heat transfer simulation based on the nature of PCM, such as the one we mentioned above, NaOH (73.2%)+NaCl (26.8%) mixture with latent heat of 370 kJ/kg, if this PCM mixture is packaged into a 5 cm diameter pipe, within 5 hours, more than 80% PCM in the pipe will be melted when VP-1 vapor temperature is 10 degree higher than its melting point, 369° C. Therefore, an array of modular containers with secondary PCM cylindrical container size of 5 cm can be connected in parallel to form large enough capacity to supply sufficient thermal energy to meet power plant's need, since charging and discharging time scales are usually more than 5 hours.

In a different application, thermal exchange/storage method described above can be used to eliminate the need for cooling water in the Rankine cycle and other processes, such as refrigeration and desalination. For example, in a Rankine cycle involves a steam turbine generator, low temperature steam, e.g. at 60° C. is coming out from the outlet of the turbine. For 1 ton of steam, there are about 650 kWh of latent heat needed to dissipate by cooling water. Instead of dissipation by cooling water, we can use low temperature PCM listed in Table 3 to store the latent heat using the method and system described above and below in this disclosure. First, as steam vapor as HTF enters the storage/heat exchange container, it will contact with solid-liquid PCM with proper transition temperature, in this case 30-50° C., the vapor will condense into water at the surface of PCM secondary container; as the PCM is charged up, the shutoff valve of this container will be closed, and vapor will be feed into other parallel connected similar containers. To use the heat stored in this container, water/vapor will then be evacuated before a different liquid-gas PCM heat exchange medium with low boiling temperature will be introduced into the container through showering/dripping system onto the surface of storage secondary containers, and to be evaporated into vapor. The vapor then will deliver its latent heat to heat output device and working medium to heat appliances or to container surface to be dissipated into environment. If a modular storage container only stores the thermal energy from turbine outlet for a fraction of operating time, and then re-use or dissipate it for a much longer time frame at rest of the day, deployment of an array of this type of storage apparatus will eliminate the need for cooling water. Since PCM effective heat capacity can be 100 times larger than water, a much small volume of storage containers are needed in this application. For 1 ton of steam vapor for 1 hour, one only needs 9.3 ton of $Na_2SO_4 \cdot 10H_2O$ PCM storage materials, if storage filling ration is 0.5, one needs only 12 $m^3$.

Figure 9:
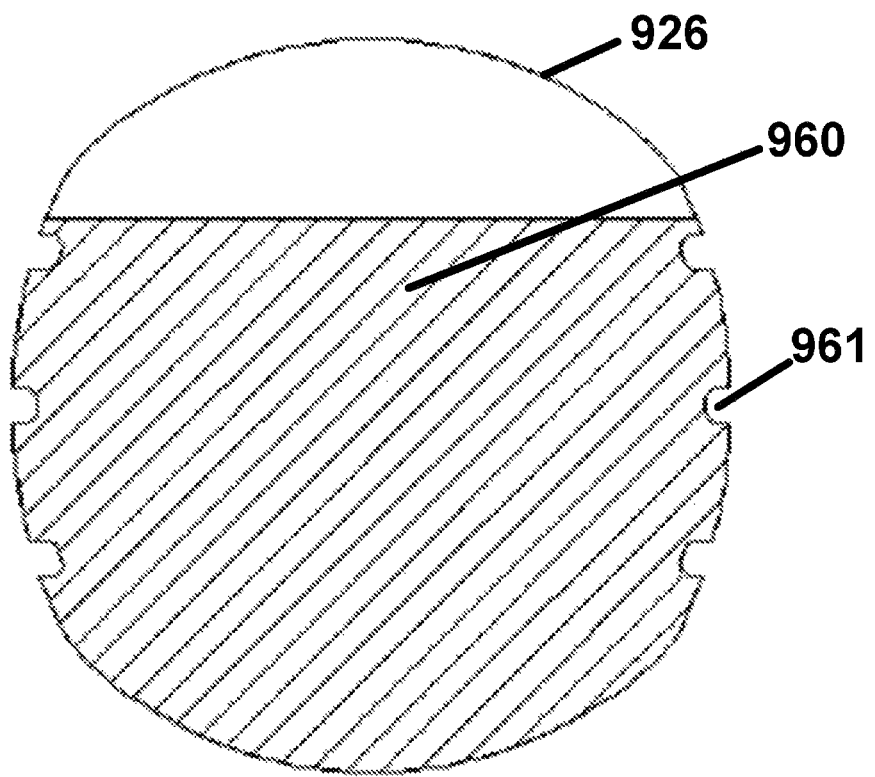
FIG. 9 is a schematic view of an exemplary solid-liquid PCM container design consistent with certain aspects related to the innovations herein.

FIG. 1 is a block diagram of an exemplary system, which includes a heat transfer fluid (HTF) 148, a PCM storage media 126 and a working fluid 147, and heat exchange medium 118 (e.g. a liquid-gas PCM), consistent with certain aspects related to the innovations herein. The illustrated system may include solid-liquid PCMs thermal energy storage features and a liquid-gas PCM heat exchange apparatus. Referring to FIG. 1, HTF from a heat source or collector 112 carries thermal energy flow through input heat transfer device 110 into the main container 114 via its surface 116 inside the container 114 and locates at the container bottom. Solid-liquid PCM 126, contained in a secondary containers with certain shapes, with voids among them as described in more detail in connection with FIG. 9, are used as main thermal energy storage materials in container 114. Input heat transfer device surface 116 is in physical contact with liquid-gas PCM 118. The volume of liquid state of PCM 118 is much smaller than the vapor form 120 of 118 which fills empty space volume in container 114, including void volume of solid materials 126 with a certain ratio. Liquid form of PCM 118 is designed to achieve thermal equilibrium quickly with HTF to reach evaporating stage. Liquid-gas PCM vapor 120 fills entire container upon evaporation. Upon in contact with cold surfaces of solid thermal storage material 126, the vapor condenses instantly while transferring latent heat to solid materials 126; condensed PCM liquid droplet 119 drips down to bottom of storage container 114 to start evaporation-condensation cycle again, until all thermal storage materials 126 in thermal equilibrium with storage container working temperature. Channels are designed to allow PCM vapor 120 traveling directly to storage container top. Upon liquid-gas PCM vapor 120 in contact with surfaces of output heat transfer device 122, it is condensed instantly while transferring latent heat from PCM vapor 120 to WF. The heat output device may also include the working medium/fluid itself 147, exit tubing 151 for the hot working medium/fluid, a storage tank 142, and return tubing 150 for the cooled working fluid circulating back into the chamber 114. Temperature of cold WF 124 is raised to working temperature of storage container 114 quickly due to extremely high heat transfer rate. When solar thermal collector field stops collecting thermal energy, due to cloudy weather or in the evening, stored thermal energy needs to be taken out from thermal storage container 114, a circulation pump 132, in fluid communication with a liquid-gas PCM reservoir 130 and bottom of the storage container 114, forces PCM liquid 118 to a liquid showering/tripling device 134 at top of thermal storage containers 126. PCM liquid 118 is spread onto high temperature surface of secondary containers of solid thermal storage material 126. PCM 118 is heated on the surfaces of secondary containers of solid materials 126 and becomes vaporized. The vapor releases latent heat to cold WF 124 via same process as described previously. The condensed PCM 118 droplets falls down from the container top, continue this dissemination, including a heat via contact, vaporization, and condensation process, until all the available thermal energy being used up in the thermal storage container.

Using a circulation pump to pump in or out PCM liquid 118 from a small reservoir 130 and inert pressurized gas (not shown in Figure) also controls the ratio of vapor 120 volume versus liquid 118 volume of PCM so that ultimate pressure, monitored by pressure gauge 141 and data acquisition/control unit 144 and computer 145, and working-temperature in thermal storage container is easily controlled. In addition, this working temperature is readily tuned continuously, to desired levels. The system of FIG. 1 may also include a variety of other valves and interconnections as set forth throughout this disclosure, including a valve 140 that serves to couple the heat transfer fluid system to adjacent/associated heat transfer systems, such as to a heat storage tank 143 in another such system.

Figure 2:
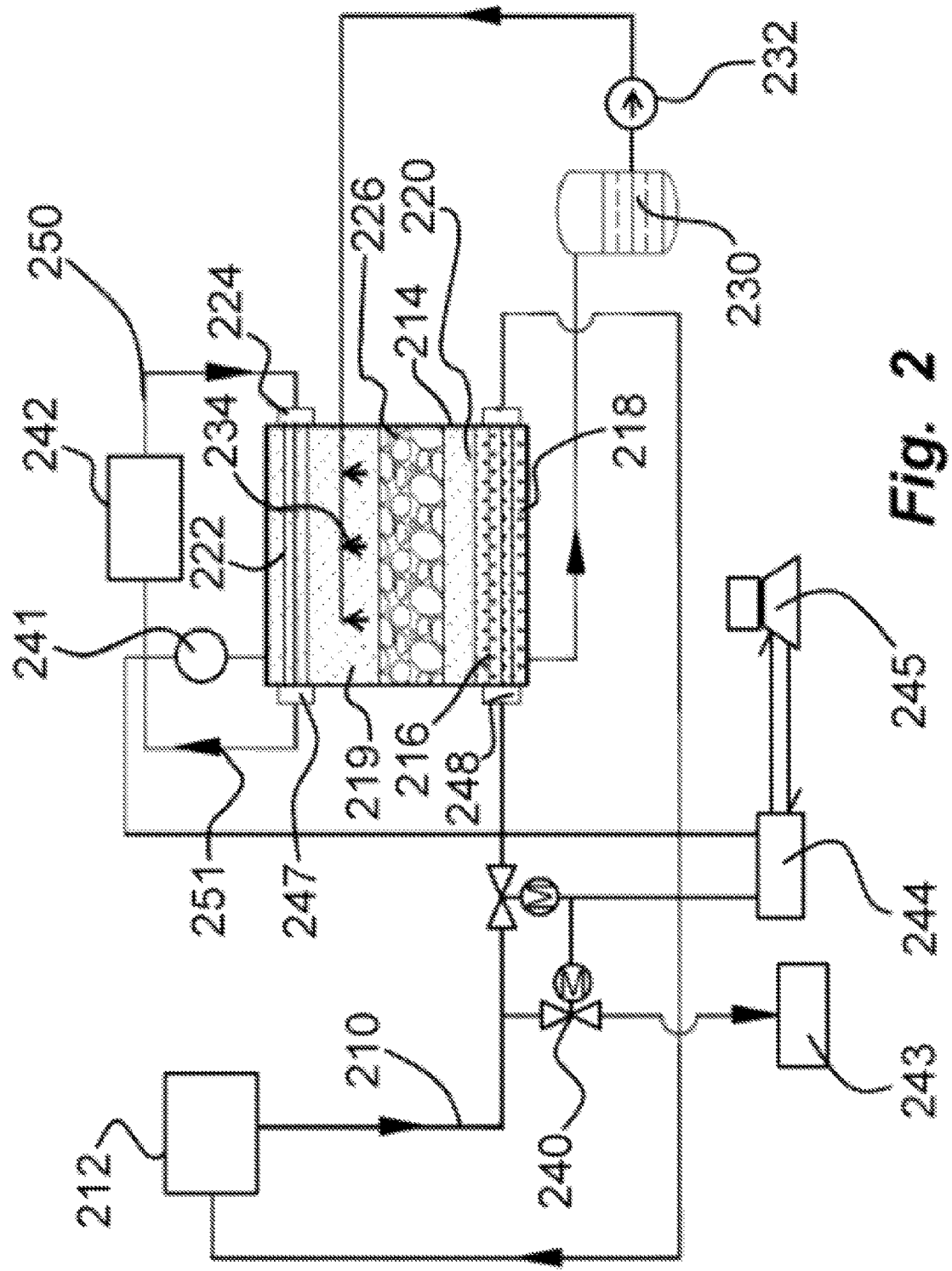
FIG. 2 is a block diagram of another exemplary system consistent with certain aspects related to the innovations herein.

FIG. 2 is a block diagram of an exemplary system including a heat input device, PCM storage media, a heat output device, and a heat exchange system, consistent with certain aspects related to the innovations herein. Referring to FIG. 2, an exemplary system for transferring/storing heat may comprise a heat exchange/storage apparatus including a chamber 214, a heat input device 210 that carries a heat transfer fluid (HTF) from a source or collector 212 and carries thermal energy flow through input heat transfer device 210 into the chamber 214 via its surface 216, which are inside and may be located generally toward the bottom of the chamber 214, a thermal storage medium 226 located within the chamber, a heat output device, and a heat exchange system 230/232/234 that delivers a heat exchange medium/fluid to the thermal storage medium 226. Input heat transfer device surface 216 is in physical contact with liquid-gas PCM 218. The volume of liquid state of PCM 218 is much smaller than the vapor form 220 of 218 which fills empty space volume in container 214, including void volume of solid materials with a certain ratio. Liquid form of PCM 218 is designed to achieve thermal equilibrium quickly with HTF 216 to reach evaporating stage. Liquid-gas PCM vapor 220 fills entire container upon evaporation. Upon in contact with cold surfaces of solid thermal storage material 226, the vapor condenses instantly while transferring latent heat to solid materials 226; condensed PCM liquid droplet 219 drips down to bottom of storage container 214 to start evaporation-condensation cycle again, until all thermal storage materials 226 in thermal equilibrium with storage container working temperature. Channels are designed to allow PCM vapor 220 traveling directly to storage container top. Upon liquid-gas PCM vapor 220 in contact with surfaces of output heat transfer device 222, it is condensed instantly while transferring latent heat from PCM vapor 220 to the cold WF 224. As such, the temperature of the cold WF 224 may be raised to working temperature of storage container (chamber 214) quickly due to extremely high heat transfer rate. The heat output device includes heat output device surfaces 222 that pass through and are exposed within the chamber 214.

The thermal storage medium 226 is located within the chamber 214 and has defined thermal storage surfaces. In the exemplary implementation of FIG. 2, the thermal storage medium 226 may include liquid, solid, liquid and solid mixed, or sensible heat storage. In case of solid sensible material, no secondary container needed.

The heat output device is part of a heat output system, which may also include the output surfaces 222, the working medium/fluid itself 247, exit tubing 251 for the hot working medium/fluid, a storage tank 242, and return tubing 250 for the cooled working fluid circulating back into the chamber 214.

As indicated above, the heat exchange system 230/232/234 delivers a heat exchange medium/fluid to the thermal storage material 426 surfaces. According to implementations herein, the heat exchange medium/fluid may be one or more media/fluids selected from the list of materials set forth in Table 1. The heat exchange system may also include one or more storage tanks 230 as well as various valves and other flow control elements 232.

Figure 12:
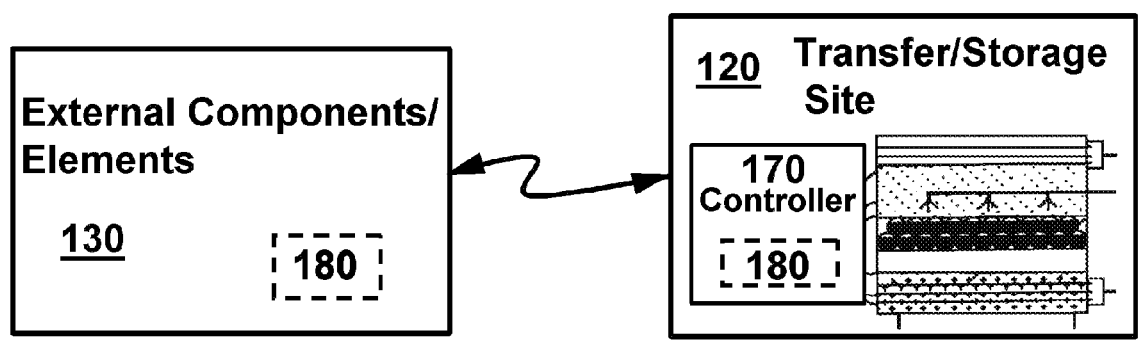
FIG. 12 is block diagram illustrating an exemplary thermal transfer/storage system in connection with associated computing/processing environments, consistent with certain aspects related to the innovations herein.

As set forth in more detail in association with FIG. 12, the system of FIG. 2 may also include computing/processing and control elements, such as pressure gage 141, data acquisition or processing components 244 and computer terminals 245, GUIs and other user interaction elements, among others.

The system of FIG. 2 may also include a variety of other valves and interconnections as set forth throughout this disclosure, including a valve 240 that serves to couple the heat transfer fluid system to adjacent/associated heat transfer systems, such as to a heat storage tank 243 in another such system.

Figure 3:
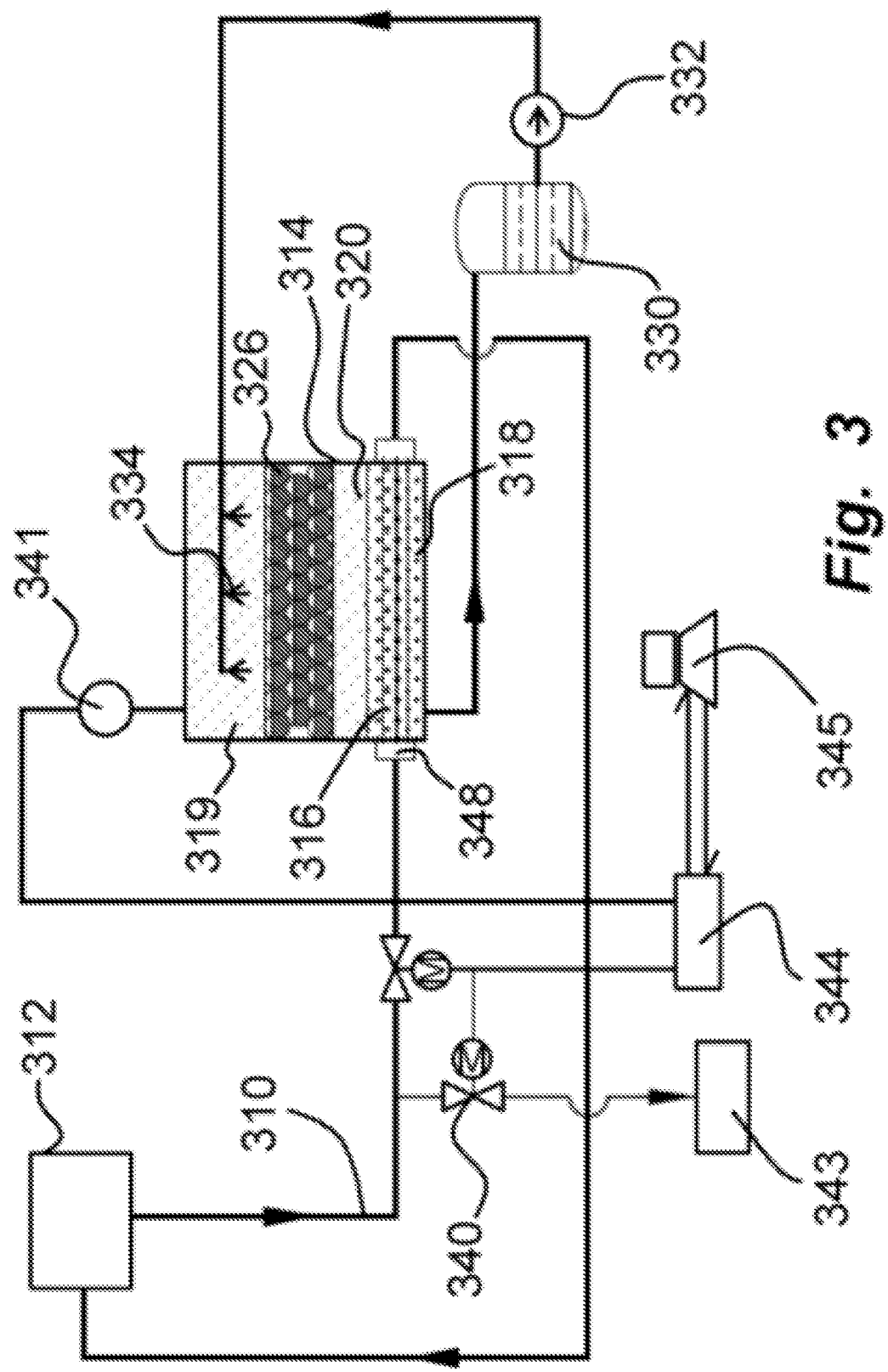
FIG. 3 is a block diagram of still another exemplary system consistent with certain aspects related to the innovations herein.

FIG. 3 is a block diagram of an exemplary system, which includes a heat transfer fluid (HTF), PCM storage media, and a heat exchange system, consistent with certain aspects related to the innovations herein. The system of FIG. 3 differs from the system of FIGS. 1 and 2 in that there is no heat output device or working fluid. The illustrated system may include PCM (solid-liquid, etc.) thermal energy storage features and a PCM (liquid-gas, etc.) heat exchange apparatus. Referring to FIG. 3, HTF from a heat source or collector 312 carries thermal energy flow through input heat transfer device 310 into the main container 314 via surfaces 316 inside the chamber 314 which may be located at the container bottom. Solid-liquid PCM 326, contained in secondary containers with specified shapes, with voids among them as described in more detail in connection with FIG. 9, are used as main thermal energy storage materials in container 314. Input heat transfer device surface 316 is in physical contact with liquid-gas PCM 318. The volume of liquid state of PCM 318 is much smaller than the vapor form 320 of the PCM 318 which fills empty space volume in container 314, including void volume of solid materials 326 with a certain ratio. Liquid form of PCM 318 is designed to achieve thermal equilibrium quickly with the HTF 316 to reach evaporating stage. In operation, the liquid-gas PCM vapor 320 fills the entire container 314 upon evaporation. Upon contact with the lower-temperature surfaces of solid thermal storage material 326, the vapor condenses instantly while transferring latent heat to storage materials 326. Condensed PCM liquid droplets 319 then drip down to the bottom of storage container 314 to start evaporation-condensation cycle again, until all thermal storage materials 326 in thermal equilibrium with storage container working temperature. The chamber 314 may be configured with channels that allow PCM vapor 320 to travel directly to the storage container top.

Using a circulation pump to pump PCM liquid 318 in or out from a small reservoir 330 and inert pressurized gas (not shown in Figure) may be used to control the ratio of vapor 320 volume versus liquid 318 volume of PCM so that both ultimate pressure, monitored by pressure gauge 341 and data acquisition/control unit 344 and computer 345, and working temperature in the thermal storage container may be easily controlled. In addition, the system may be configured such that this working temperature may be tuned continuously to a desired temperature or range. The system of FIG. 3 may also include a variety of other valves and interconnections as set forth throughout this disclosure, including liquid showering device 334 at top of thermal storage containers flow control elements 332, 326, a valve 340 that serves to couple the heat transfer fluid system to adjacent/associated heat transfer systems, such as to a heat storage tank 343 in another such system.

Figure 4:
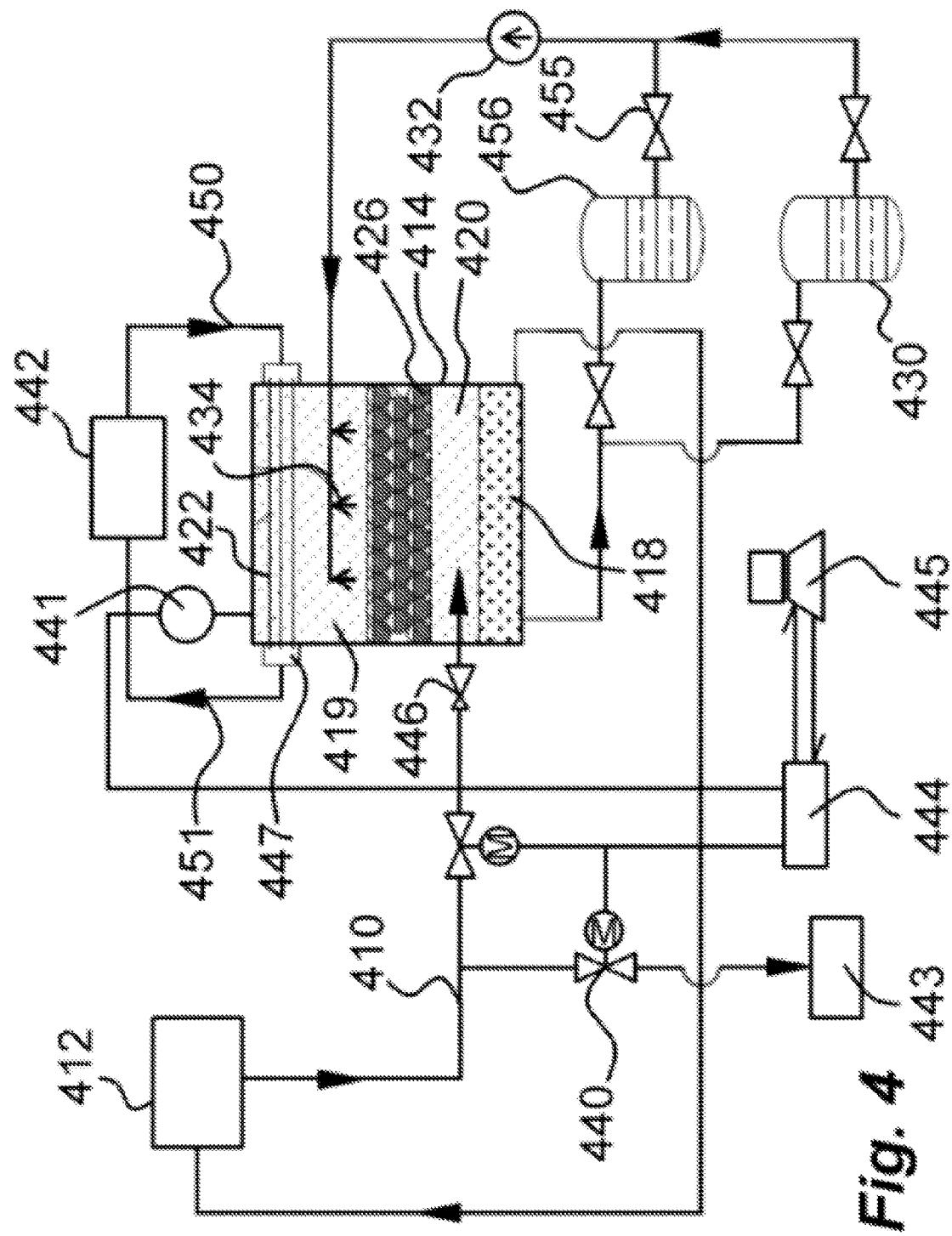
FIG. 4 is a block diagram of yet another exemplary system consistent with certain aspects related to the innovations herein.

FIG. 4 is a block diagram of an exemplary system including a heat input device, PCM storage media, a heat output device, and a heat exchange system, consistent with certain aspects related to the innovations herein. Referring to FIG. 4, an exemplary system for transferring/storing heat may, comprise a heat exchange/storage apparatus 400 including a chamber 414, a heat input device 410/446 that carries a heat transfer fluid (HTF) from a source or collector 412 and injects a vapor form of the heat transfer fluid through a valve device into the chamber, a thermal storage medium 426 located within the chamber, a heat output device, and a heat exchange system 456/455/434 that delivers a heat exchange medium/fluid 419 to the thermal storage medium 426. In operation, the heat input device injects the vapor form 420 of the heat transfer fluid through a nozzle, throttle or valve, etc. into the chamber. The vapor form of the HTF may contact surfaces of the thermal storage medium 426 and condense thereon, delivering latent heat from the vapor form to the thermal storage medium via phase change from vapor to liquid. The heat output device includes heat output device surfaces 422 that pass through and are exposed within the chamber 414, and the vapor form of the HTF may also contact these output device surfaces to condense thereon and deliver heat. The heat transfer fluid that is condensed into liquid form is recirculated 452 out of the chamber back to the heat source or collector 412, such as a heat storage tank.

The thermal storage medium 426 is located within the chamber 414 and has defined thermal storage surfaces, such as is explained in more detail in connection with FIG. 9. In the exemplary implementation of FIG. 4, the thermal storage medium 426 may include one or more phase change material(s) as set forth in Tables 2 and/or 3.

The heat output device is part of a heat output system, which may also include the output surfaces 422, the working medium/fluid itself 447, exit tubing 451 for the hot working medium/fluid, a storage tank 442, and return tubing 450 for the cooled working fluid circulating back into the chamber 414.

As indicated above, the heat exchange system 456/455/434 delivers a heat exchange medium/fluid to the thermal storage material 426 surfaces. According to implementations herein, the heat exchange medium/fluid may be one or more media/fluids selected from the list of materials set forth in Table 1. The heat exchange system may also include one or more storage tanks 456, 430 as well as various valves 455 and other flow control elements 432.

As set forth in more detail in association with FIG. 12, the system 400 may also include computing/processing and control elements, such as pressure gage 441, data acquisition or processing components 444 and computer terminals 445, GUIs and other user interaction elements, among others.

The system 400 may also include a variety of other valves and interconnections as set forth throughout this disclosure, including a valve 440 that serves to couple the heat transfer fluid system to adjacent/associated heat transfer systems, such as to a heat storage tank 443 in another such system.

Figure 5:
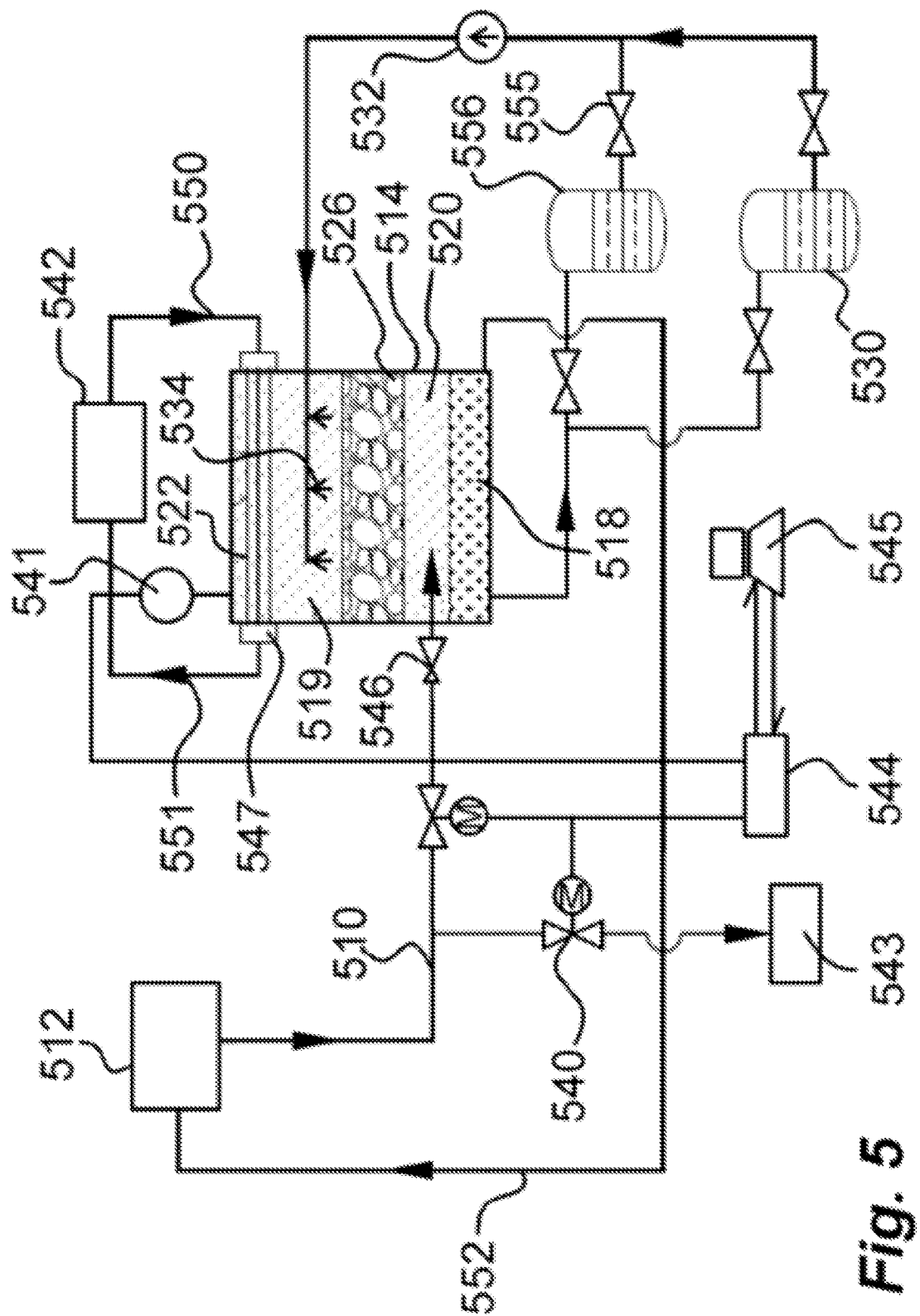
FIG. 5 is a block diagram Of a further exemplary system consistent with certain aspects related to the innovations herein.

FIG. 5 is a block diagram of an exemplary system including a heat input device, PCM storage media, a heat output device, and a heat exchange system, consistent with certain aspects related to the innovations herein. Referring to FIG. 5, an exemplary system for transferring/storing heat may comprise a heat exchange/storage apparatus including a chamber 514, a heat input device 510/valve 546 that carries a heat transfer fluid (HTF) from a source or collector 512 and injects a vapor form of the heat transfer fluid through a valve device into the chamber, a thermal storage medium 526 located within the chamber, a heat output device, and a heat exchange system 556/555/534 that delivers a heat exchange medium/fluid to the thermal storage medium 526. In operation, the heat input device injects 553 the vapor form 520 of the heat transfer fluid through a nozzle, throttle or valve, etc. into the chamber. The vapor form of the HTF may contact surfaces of the thermal storage medium 526 and condense thereon, delivering latent heat from the vapor form to the thermal storage medium via phase change from vapor to liquid. The heat output device includes heat output device surfaces 522 that pass through and are exposed within the chamber 514, and the vapor form of the HTF may also contact these output device surfaces to condense thereon and deliver heat. The heat transfer fluid that is condensed into liquid form is recirculated 552 out of the chamber back to the heat source or collector 512, such as a heat storage tank.

The thermal storage medium 526 is located within the chamber 514 and has defined thermal storage surfaces. In the exemplary implementation of FIG. 5, the thermal storage medium 426 may include liquid, solid, liquid and solid mixed, and/or sensible heat storage material.

The heat output device is part of a heat output system, which may also include the output surfaces 522, the working medium/fluid itself 547, exit tubing 551 for the hot working medium/fluid, a storage tank 542, and return tubing 550 for the cooled working fluid circulating back into the chamber 514.

As indicated above, the heat exchange system 556/555/534 delivers a heat exchange medium/fluid 519 to the thermal storage material 526 surfaces. According to implementations herein, the heat exchange medium/fluid may be one or more media/fluids selected from the list of materials set forth in Table 1. The heat exchange system may also include one or more storage tanks 556, 530 as well as various valves 555 and other flow control elements 532.

As set forth in more detail in association with FIG. 12, the system of FIG. 5 may also include computing/processing and control elements, such as pressure gage 541, data acquisition or processing components 544 and computer terminals 545, GUIs and other user interaction elements, among others.

The system of FIG. 5 may also include a variety of other valves and interconnections as set forth throughout this disclosure, including a valve 540 that serves to couple the heat transfer fluid system to adjacent/associated heat transfer systems, such as to a heat storage tank 543 in another such system.

Figure 6:
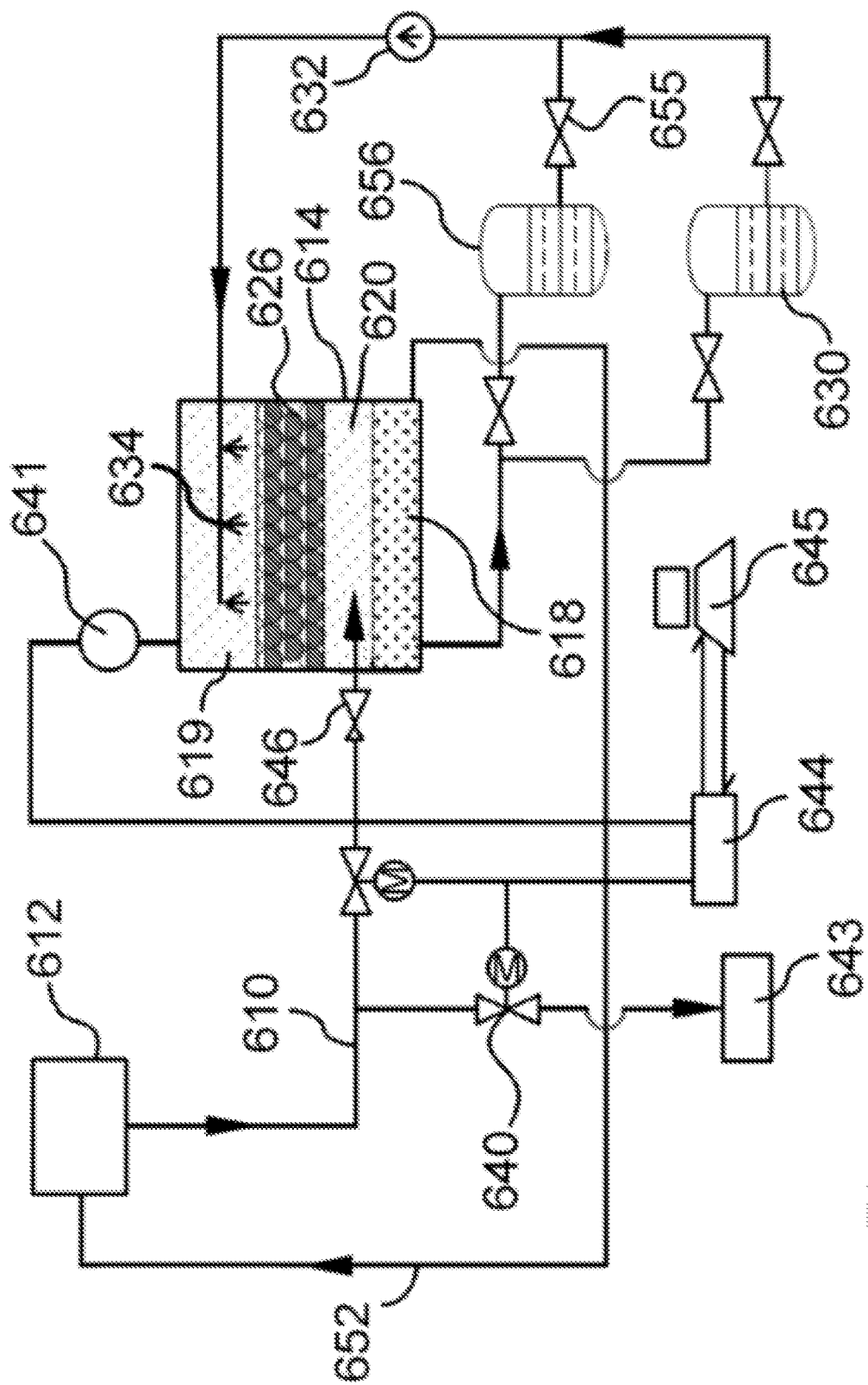
FIG. 6 is a block diagram of still a further exemplary system consistent with certain aspects related to the innovations herein.

FIG. 6 is a block diagram of an exemplary system including a heat input device, PCM storage media, and a heat exchange system, consistent with certain aspects related to the innovations herein. The system of FIG. 6 differs from the system of FIG. 4 in that there is no heat output device or working fluid.

Referring to FIG. 6, an exemplary system for transferring/storing heat may comprise a heat exchange/storage apparatus including a chamber 614, a heat input device 610/valve 646 that carries a heat transfer fluid (HTF) from a source or collector 612 and injects a vapor form of the heat transfer fluid through a valve device into the chamber, a thermal storage medium 626 located within the chamber, and a heat exchange system 656/655/634 that delivers a heat exchange medium/fluid 619 to the thermal storage medium 626. In operation, the heat input device injects 653 the vapor form 620 of the heat transfer fluid through a nozzle, throttle or valve, etc. into the chamber. The vapor form of the HTF may contact surfaces of the thermal storage medium 626 and condense thereon, delivering latent heat from the vapor form to the thermal storage medium via phase change from vapor to liquid. The heat output device includes heat output device surfaces 622 that pass through and are exposed within the chamber 614, and the vapor form of the HTF may also contact these output device surfaces to condense thereon and deliver heat. The heat transfer fluid that is condensed into liquid form is recirculated 652 out of the chamber back to the heat source or collector 612, such as a heat storage tank.

The thermal storage medium 626 is located within the chamber 414 and has defined thermal storage surfaces, such as is explained in more detail in connection with FIG. 9. In the exemplary implementation of FIG. 6, the thermal storage medium 626 may include one or more phase change material(s) as set forth in Tables 2 and/or 3.

As indicated above, the heat exchange system 656/655/634 delivers a heat exchange medium/fluid to the thermal storage material 626 surfaces. According to implementations herein, the heat exchange medium/fluid may be one or more media/fluids selected from the list of materials set forth in Table 1. The heat exchange system may also include one or more storage tanks 656, 630 as well as various valves 655, pressure gage 641, and other flow control elements 632.

As set forth in more detail in association with FIG. 12, the system of FIG. 6 may also include computing/processing and control elements, such as data acquisition or processing components 644 and computer terminals 645, GUIs and other user interaction elements, among others.

The system FIG. 6 may also include a variety of other valves and interconnections as set forth throughout this disclosure, including a valve 640 that serves to couple the heat transfer fluid system to adjacent/associated heat transfer systems, such as to a heat storage tank 643 in another such system.

Figure 7:
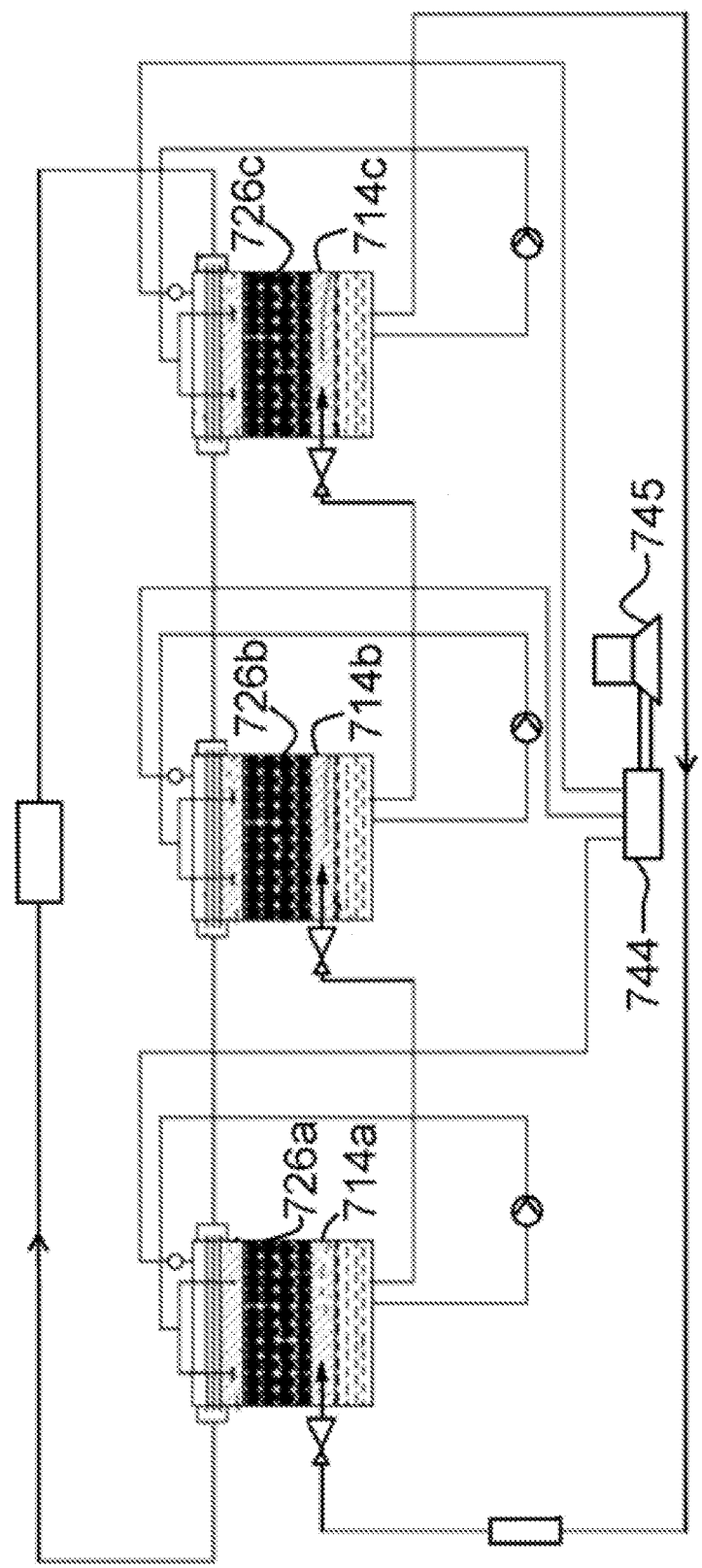
FIG. 7 is a block diagram of an exemplary system comprising a plurality of cascaded heat transfer/storage subsystems, consistent with certain aspects related to the innovations herein.

The implementations described herein may also easily cascaded into several subsystems connected together in series, as illustrated in FIG. 7. FIG. 7 is a block diagram of an exemplary system comprising a plurality of cascaded heat transfer/storage subsystems, consistent with certain aspects related to the innovations herein. Like the systems described above, the subsystems comprise, inter alia, chambers 7114a, 714b, and 714c containing thermal storage media 726a, 726b, and 726c respectively, data acquisition/control unit 744 and computer 745. The principle of such heat exchange and thermal storage systems is the same as that of thermosiphons: heat transfer rate is proportional to the collision rate of vapor molecules to condensing surfaces, where a fraction of vapor molecules that hit surfaces is immediately condensed into liquid phase, releasing latent heat to surfaces of heat transfer devices. The value of this fraction depends on the nature of liquid PCM, working pressure and temperature in container. Using gas kinetic formula it is readily estimated heat transfer rate with this method.

The number of molecules (N in mole) that collide with unit surface area on condensing surface within unit time: $N=Z_m/N_a=P/(\text{square root}[2RMT])$, Where $Z_m$ is collision rate, $N_a$ is Avogadro's number, P is PCM pressure, T is PCM temperature in Kelvin, R is atmospheric constant, M is mole weight in kg. For example, at 100 C (373K) and 1 atmosphere ($10^5$ pa) for water vapor molecules, N=5400 mole/sec $m^2$=0.54 mole/sec $cm^2$. If every water vapor molecule that collide with heat transfer surface condenses into liquid phase, latent heat released per second on each square centimeter is Heat transfer rate=22 kj/sec $cm^2$=22 $kW/cm^2$=220 $MW/m^2$. At 180 C (453K) and 10 atmosphere (1 MPa), N=48452 mole/sec $m^2$=4.85 mole/sec $cm^2$, heat transfer rate=180 $kW/cm^2$=1800 $MW/m^2$. There is only a fraction of molecules that hit heat transfer surface is condensed into liquid phase, the above estimated heat transfer rate is an upper limit for the practical value.

The highest (World record) heat transfer rate for a heat pipe (which has the same working principle as a Thermosiphon) is 230 $MW/m^2$, a value that is on the same order as the innovations herein. With the second example, every 8 water molecules that hit the surface is condensed into liquid phase while transfer the latent heat into condensed surfaces. It should be noted that this heat transfer rate value is 4 times the heat flux of the radiation from the Sun at its space.

Accordingly, as a result of the innovations herein, one or more of the following features may be achieved: 1) innovations that greatly improve heat exchanger design configurations; 2) easy transfer of thermal energy to and from thermal storage containers/solid thermal storage materials, enabling innovative and efficient utilization of solid thermal storage materials, achieving reduced cost of thermal storage; 3) greatly improvements in heat exchange efficiencies of thermal storage containers; 4) improved features of utilizing the solid to liquid phase change latent heat via packaging of PCMs; and/or 5) flash evaporation methods that simplify the thermal energy input process, which also makes the control of the working temperature in the thermal storage container much easier.

Figure 8:
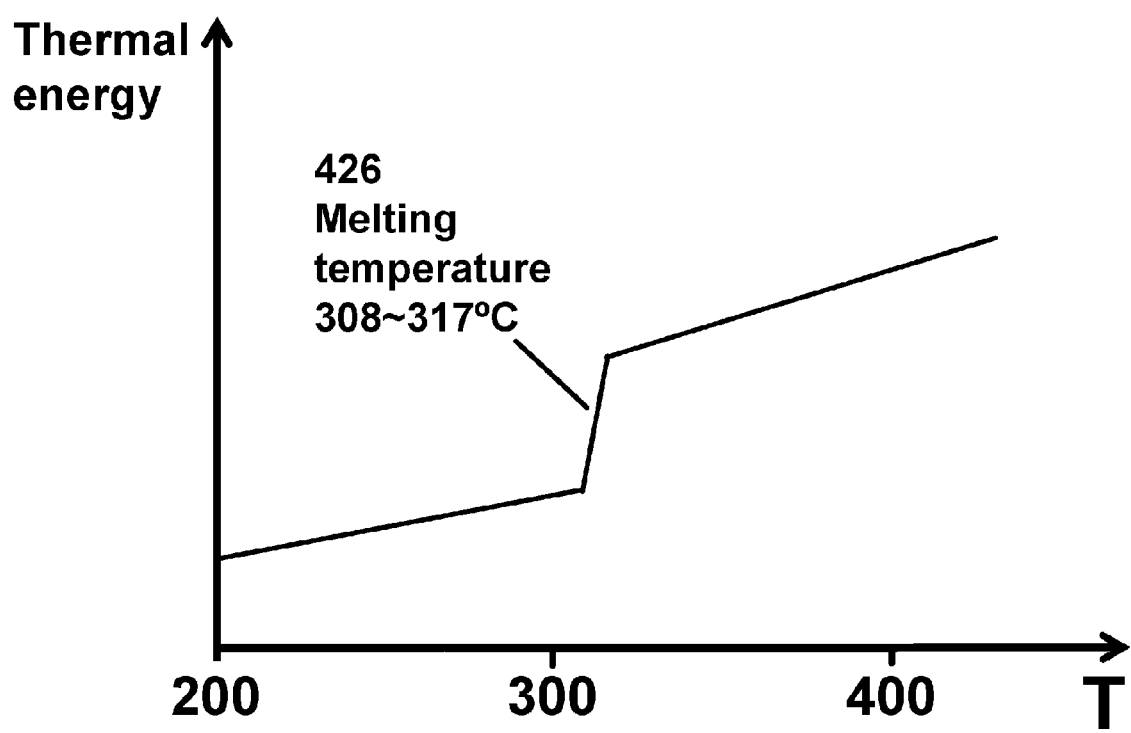
FIG. 8 is a graph illustrating an exemplary relationship of thermal energy versus PCM temperature, showing latent heat at solid-liquid phase transition, consistent with certain aspects related to the innovations herein.

FIG. 8 illustrates an exemplary thermal energy versus temperature diagram for solid-liquid PCMs 126. Phase change transition temperatures for this PCM are 308° C. Below and above phase transition temperature, thermal energy versus temperature slops is shallow, indicating sensible-heat region. At phase transition temperatures, thermal energy versus temperature slops is extremely steep, indicating latent heat region. Normally, thermal energy density and effective heat capacity at phase transition region is one to two orders of magnitude higher than that of sensible-heat region. Thermal energy storage density at a given temperature range is greatly increased.

This property is especially important for concentration solar thermal applications. For any given concentration solar thermal collecting field, there is an upper limit for the highest temperature this solar field can achieve. For example, for a synthetic oil based trough system, due to upper temperature limit of the synthetic oil, the highest temperature this solar field can reach is 400 C. For a thermal storage system with highest stored temperature at 400 C, the higher the temperature and pressure steam it generated, the higher thermal to electricity conversion efficiency it can achieve, the cost of the electricity can be lowered. For example, with current thermal storage design, a solid-liquid PCM, such as a crystal mixture of Sodium Chloride and Sodium Hydroxide salts with phase change temperature at 385 C and thermal storage density at 370 kj/kg, can be used to store the thermal energy at 385 C during the day and release the thermal energy during the evening. This stored thermal energy is able to generate water steam at 360 C with pressure of 18.5 MPa pressure. If one wants to use two container molten salt thermal storage system to achieve the same effect, the amount of thermal storage material used has to be 15 to 20 time more than the solid-liquid PCM thermal storage material. The closer the generated steam's temperature to the upper temperature limit (400 C, in this case), the more advantage of PCM against the sensible-heat thermal storage solution.

FIG. 9 illustrates an exemplary implementation of a solid-liquid PCM package, which can be used in above mentioned thermal storage container. For solid-liquid phase change thermal storage materials, specially designed metal containers 926 may be used to contain PCMs 960. This container 926 is made with elastic metal shell so that when solid phase material changes to liquid phase materials, or vise versa, adapts volume changes during phase change process. Grooves 961 are made on container shell can accommodate the volume changes during phase transitions. Such structure arrangement is used to replace solid sensible-heat storage materials in the thermal energy storage container.

In general, many types of solid materials can be used in such a thermal storage device. In addition, many types of solid to liquid phase changing materials can also be used in such a thermal storage apparatus as long as such PCMs can be stored into solid shell containers described previously so that after undergoing phase change PCM can still be hold inside the solid containers to keep the voids volume in thermal storage container intact. The heat storage density can increase by a factor of 10 to 20 due to phase change latent heat so that thermal storage volume is reduced dramatically. The main cost of such a heat exchange/thermal storage apparatus will be the cost of storage materials, such as rocks, ceramics, metal ore, concrete, various nitride salts, and other salts. The container can be made of steel or other strong metal, or steel concrete materials that have strong tensile strength at high temperature.

Figure 10:
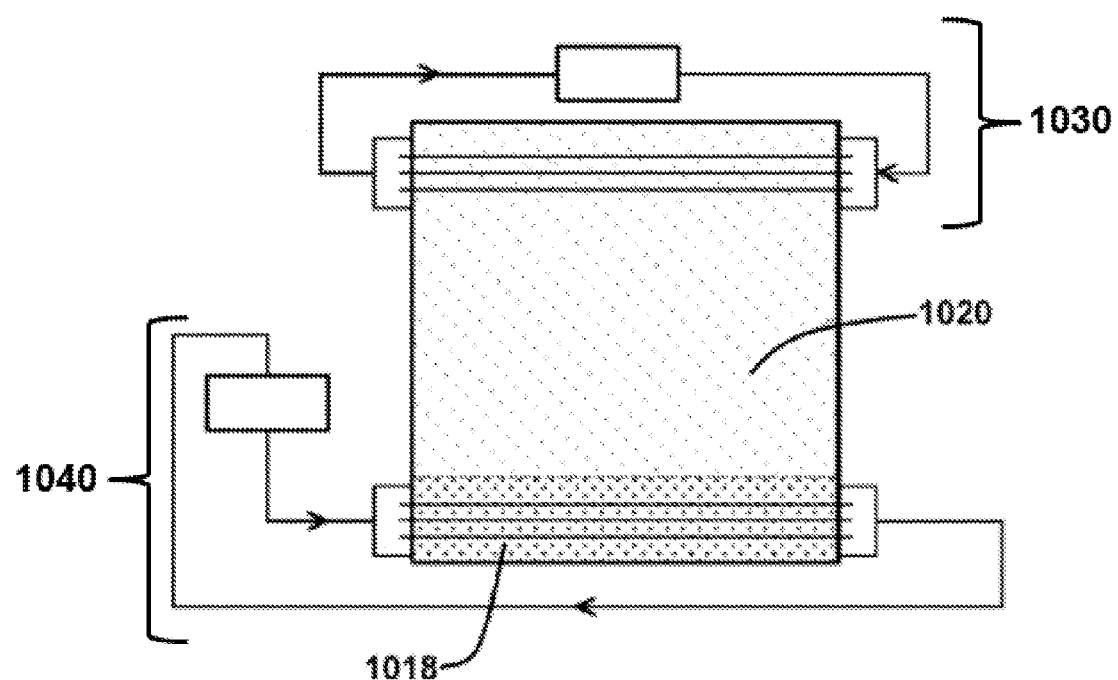
FIG. 10 is block diagram illustrating an exemplary system without any thermal storage media consistent with certain aspects related to the innovations herein.

FIG. 10 is block diagram illustrating an exemplary system without any thermal storage media consistent with certain aspects related to the innovations herein. Referring to FIG. 10, the heat input and heat transfer fluid system 1040 and the heat output and working fluid system 1030 are implemented to transfer heat via vapor 1020 and liquid 1018 forms of a HTF in manners consistent with similar systems in the embodiments set forth above, without any operation or involvement of heat storage media.

Figure 11:
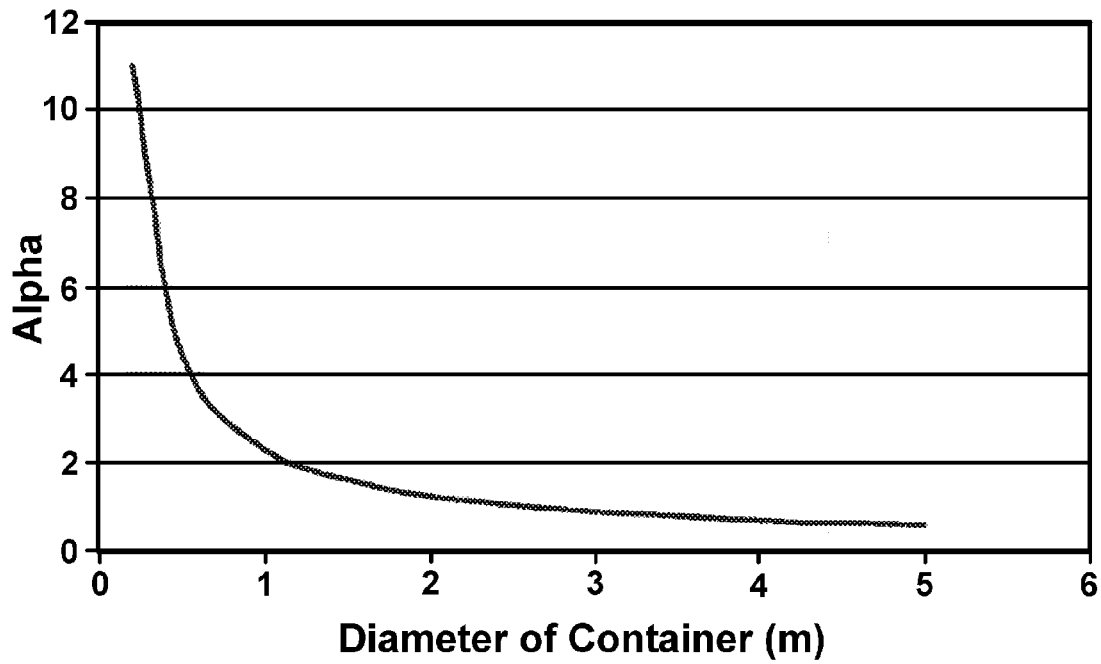
FIG. 11 is a graph illustrating an exemplary relationship between a ratio of pressurized container material cost/price versus PCM cost/price versus the radius of the thermal storage container, consistent with certain aspects related to the innovations herein.

FIG. 11 is a graph illustrating an exemplary relationship between a ratio of pressurized container material cost/price versus PCM cost/price versus the radius of thermal storage container, consistent with certain aspects related to the innovations herein. Further details of the innovations and relationships embodying features consistent with this graph are set forth elsewhere herein.

FIG. 12 illustrates a block diagram of an exemplary heat transfer/storage system in accordance with one or more implementations of the innovations herein. Referring to FIG. 12, the heat transfer/storage system may comprise a transfer/storage field 120 including transfer/storage apparatus 100 and a controller 170 and, optionally, one or more elements of external systems 130. The controller may include one or more computing components, systems and/or environments 180 that perform, facilitate or coordinate control of heat storage/transfer. As explained in more detail below, such computing elements may take the form of one or more local computing structures that embody and perform a full implementation of the features and functionality herein or these elements may be distributed with one or more controller(s) 170 serving to coordinate the distributed processing functionality. Further, the controller 170 is not necessarily in close physical proximity to the collectors 100, though is shown in the drawings as being associated with the transfer/storage site 120. The system may also include one or more optional external devices or systems 130, which may embody the relevant computing components, systems and/or environments 180 or may simply contain elements of the computing environment that work together with other computing components in distributed arrangements to realize the functionality, methods and/or innovations herein.

With regard to computing components and software embodying the inventions herein, such as the heat transfer and/or storage methods, the innovations herein may be implemented/operated consistent with numerous general purpose or special purpose computing system environments or configurations. Various exemplary computing systems, environments, and/or configurations that may be suitable for use with the innovations herein may include, but are not limited to, personal computers, servers or server computing devices such as routing/connectivity components, hand-held or laptop devices, multiprocessor systems, microprocessor-based systems, set top boxes, smart phones, consumer electronic devices, network PCs, other existing computer platforms, distributed computing environments that include one or more of the above systems or devices, etc.

The invention may be described in the general context of computer-executable instructions, such as program modules, being executed by a computer, computing component, etc. In general, program modules may include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Computing component/environment 180 may also include one or more type of computer readable media. Computer readable media can be any available media that is resident on, associable with, or can be accessed by computing component/environment 180. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing components. Communication media may comprise computer readable instructions, data structures, program modules or other data embodying the functionality herein. Further, communication media may include wired media such as a wired network or direct-wired connection, and wireless media such as acoustic, RF, infrared and other wireless media. Combinations of the any of the above are also included within the scope of computer readable media.

In the present description, the terms component, module, device, etc. may refer to any type of logical or functional process or blocks that may be implemented in a variety of ways. For example, the functions of various blocks can be combined with one another into any other number of modules. Each module can be implemented as a software program stored on a tangible memory (e.g., random access memory, read only memory, CD-ROM memory, hard disk drive) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, implementations and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe components such as software, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

FIG. 13 illustrates an exemplary implementation of thermal storage container's geometric configurations with PCM filled inside of secondary cylindrical pipes, consistent with certain aspects related to the innovations herein. Referring to FIG. 13, an exemplary system with PCM filled within a secondary cylindrical pipe is shown, wherein the pipe may be 5 cm, about 5 cm, or other diameter. For example, according to the heat transfer implementations/innovations based on the nature of PCM, such as discussed above with NaOH (73.2%)+NaCl (26.8%) mixture with latent heat of 370 kJ/kg: here, if this PCM mixture is packaged into a 5 cm diameter pipe, then, within 5 hours, more than 80% in the pipe will be melted when VP-1 vapor temperature is 10 degree higher than its melting point, 369° C.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain exemplary implementations of the present innovations have been specifically described herein, it will be apparent to those skilled in the art to which the invention pertains that variations and modifications of the various implementations shown and described herein may be made without departing from the spirit and scope of innovations consistent with this disclosure. Accordingly, it is intended that the innovations be limited only to the extent required by the appended claims and the applicable rules of law.

TABLE 1

Heat transfer, working fluid, and heat exchange media

| ITEM | COMPONENT | MOLE WT | BOILING POINT K ($T_B$) | HEAT VAPOR NORMAL BP CAL/G-MOLE |
|---|---|---|---|---|
| THE LOW-BOILING SUBSTANCES | CHLOROFORM | 119.378 | 334.3 | 7100 |
| | METHANOL | 32.042 | 337.8 | 8426 |
| | ACETYL CHLORIDE | 78.498 | 323.9 | 6850 |
| | CYCLOPENTANE | 70.080 | 322.3 | 6536 |
| | PROPIONALDEHYDE | 58.080 | 321.0 | 6760 |
| | N-PROPYL AMINE | 59.112 | 321.8 | 7100 |
| | 2,3-DIMETHYL-1-BUTENE | 84.162 | 328.8 | 6550 |
| THE MID-BOILING SUBSTANCES | O-ETHYLPHENOL | 122.167 | 477.7 | 11490 |
| | ETHYL BENZOATE | 150.178 | 485.9 | 10700 |
| | 1,2,3,4-TETRAHYDRONAPHTHALENE | 132.206 | 480.7 | 9490 |
| | N-HEXYLCYCLOPENTANE | 154.297 | 476.3 | 9840 |
| | 1-DODECENE | 168.324 | 486.5 | 10270 |
| | VP-1 HEAT TRANSFER OIL | 166.000 | 530.0 | 11171 |
| THE HIGH-BOILING SUBSTANCES | N-OCTADECANE | 254.502 | 589.5 | 13020 |
| | N-PENTADECYLCYCLOPENTANE | 280.540 | 625.0 | 13780 |
| | 1-EICOSANOL | 298.555 | 629.0 | 15600 |

TABLE 2

Low Temperature PCMs

| | Compound | $T_m$, ° C. | $\Delta H_f$, KJ/Kg | Density, (Kg/m$^3$) | Thermal conductivity (W/(mK)) |
|---|---|---|---|---|---|
| abio-hydrous salt | LiNO3*3H2O | 30 | 296 | | |
| | Na2SO4*10H2O | 32.4 | 254 | 1485 | 0.544 |
| | Na2CO3*10H2O | 33 | 247 | 1349 (liquid, 84° C.) 1447 (solid, 24° C.) | |
| | Na2HPO4*10H2O | 36 | 281 | 1522 | |
| | Na2S2O3*5H2O | 48 | 209.3 | 1600 | |

TABLE 2-continued

Low Temperature PCMs

|  | Compound | $T_m$, °C. | $\Delta H_f$ KJ/Kg | Density, (Kg/m³) | Thermal conductivity (W/(mK)) |
|---|---|---|---|---|---|
|  | Na(CH3COO)*3H2O | 58 | 226 | 1450 |  |
|  | Na2P2O4*10H2O | 70 | 184 |  |  |
|  | 50% Na(CH3COO)*3H2O + 50% HCONH2 | 40.5 | 255 |  |  |
|  | Ba(OH)2i*8H2O | 78 | 280 | 1937 (liquid, 84° C.) 2070 (solid, 24° C.) | 0.678 (98.2° C.) 1.225 (23° C.) |
| paraffin | C16~C28 | 42~44 | 189 | 765 (liquid, 70° C.) 910 (solid, 20° C.) | 0.21 |
|  | C20~C33 | 48~50 | 189 | 769 (liquid, 70° C.) 912 (solid, 20° C.) | 0.21 |
|  | C20~C45 | 58~60 | 189 | 795 (liquid, 70° C.) 920 (solid, 20° C.) | 0.21 |
|  | C21~C50 | 66~68 | 189 | 830 (liquid, 70° C.) 930 (solid, 20° C.) |  |
|  | sliceable paraffin | 64 | 173.6/266 | 790 (liquid, 65° C.) 916 (solid, 24° C.) | 0.167 (63.5° C.) 0.346 (33.6° C.) |
| fatty acid | lauric acid | 42~44 | 177.4/178 | 862 (liquid, 60° C.) 1007 (solid, 24° C.) | 0.147 |
|  | tetradecanoic acid | 49~51 | 187 | 861 (liquid, 55° C.) 990 (solid, 24° C.) |  |
|  | cetylic acid | 63 | 187 | 850 (liquid, 65° C.) 989 (solid, 24° C.) | 0.162 |
|  | stearic acid | 70 | 203 | 848 (liquid, 70° C.) 965 (solid, 24° C.) |  |
| products in used | ClimSel C32 (hydrous salt) | 32 | 212 | 1450 |  |
|  | RT40 (paraffin state) | 43 | 181 |  |  |
|  | ST147 (hydrous salt) | 47 | 221 | 1340 |  |
|  | ClimSel C48 (hydrous salt) | 48 | 227 | 1360 |  |
|  | STL52 (hydrous salt) | 52 | 201 | 1300 |  |
|  | RT50 (paraffin state) | 54 | 195 | 1290 |  |
|  | STL55 (hydrous salt) | 55 | 242 |  |  |
|  | TH58 (hydrous salt) | 58 | 226 |  |  |
|  | ClimSel C48 (hydrous salt) | 58 | 259 | 1460 |  |
|  | RT65 (paraffin state) | 64 | 207 |  |  |

TABLE 3

High Temperature PCMs

| substance 1 | (mol %) | substance 2 | (mol %) | substance 3 | (mol %) | melting point ° C. | $\Delta H_f$ kwh/t |
|---|---|---|---|---|---|---|---|
| MnCl2 | 37.3 | NaCl | 25 | KCl | 37.7 | 400 | 65.3 |
| LiCO3 | 32 | K2CO3 | 35 | NaCO3 | 33 | 397 | 76.7 |
| MgCl2 | 50 | KCl | 20 | NaCl | 30 | 396 | 80.8 |
| MgCl2 | 51 | KCl | 22 | NaCl | 27 | 396 | 80.6 |
| KCl | 45.5 | MnCl2 | 34.5 | NaCl | 20 | 390 | 63.9 |
| MgCl2 | 63.7 | NaCl | 22.3 | KCl | 14 | 385 | 128.1 |
| KOH |  |  |  |  |  | 380 | 41.6 |
| NaOH | 73.2 | NaCl | 26.8 |  |  | 369 | 102.5 |
| KCl | 28.7 | MnCl2 | 45 | NaCl | 26.3 | 350 | 59.7 |
| KCl | 0.61 | FeCl2 | 0.39 |  |  | 345 |  |
| KNO3 |  |  |  |  |  | 335 | 24.44 |
| NaOH | 77.2 | NaCl | 16.2 | Na2CO3 | 6.6 | 318 | 80.6 |
| NaOH |  |  |  |  |  | 318 | 44.17 |
| KNO3 | 0.905 | KCl | 0.095 |  |  | 308 | 47.2 |
| NaNO3 | 0.98 | Na2CO3 | 0.02 |  |  | 307 |  |
| NaNO3 |  |  |  |  |  | 307 | 49.17 |
| NaNO3 | 0.965 | NaF | 0.035 |  |  | 303 |  |
| NaCl | 0.066 | NaNO3 | 0.934 |  |  | 298 | 58.9 |
| NaOH | 85.8 | NaCl | 7.8 | Na2CO3 | 6.4 | 298 | 79.4 |
| NaCl | 0.066 | NaNO3 | 0.934 |  |  | 298 |  |
| NaNO3 | 0.95 | Na2SO4 | 0.05 |  |  | 296 |  |
| NaNO3 | 0.95 | Na2SO4 | 0.05 |  |  | 296 |  |
| NaOH | 0.94 | Na2SO4 | 0.06 |  |  | 294 |  |
| NaOH | 87.3 | NaCl | 6.1 | Na2CO3 | 6.6 | 291 | 78.6 |
| NaCl | 8 | NaF | 5 | NaNO3 | 87 | 288 | 62.2 |
| NaNO3 | 86.3 | NaCl | 8.4 | Na2SO4 | 5.3 | 287 | 49.17 |

TABLE 3-continued

High Temperature PCMs

| substance 1 | (mol %) | substance 2 | (mol %) | substance 3 | (mol %) | melting point ° C. | $\Delta H_f$ kwh/t |
|---|---|---|---|---|---|---|---|
| Na2CO3 | 0.08 | NaOH | 0.92 | | | 286 | 94.4 |
| NaOH | 88.3 | NaCl | 5.3 | Na2CO3 | 6.4 | 282 | 77.5 |
| NaNO3 | 0.41 | NaOH | 0.59 | | | 266 | 77.2 |
| KCl | 0.28 | ZnCl2 | 0.72 | | | 264 | |
| NaNO3 | 0.194 | NaOH | 0.806 | | | 258 | 69.7~81.1 |
| NaNO3 | 0.615 | NaOH | 0.285 | | | 250 | 43.89 |
| NaNO3 | 0.615 | NaOH | 0.285 | | | 250 | 158 |
| NaOH | 55.6 | NaCl | 4.2 | NaNO3 | 40.2 | 247 | 59.2 |
| NaNO3 | 18.3 | NaCl | 3.6 | NaOH | 78.1 | 242 | 67.2 |
| NaOH | 30 | NaNO3 | 70 | | | 247 | 43.9 |
| NaOH | 28 | NaNO3 | 72 | | | 246~247 | 50.6~71.4 |

TABLE 4

Description of charging the PCM to produce 1 ton of 360° C. saturated steam

| 1 ton Water process | First level heat exchange WF Phase Change | | Second level heat exchange | |
|---|---|---|---|---|
| | Exist Vapor | Entry Liquid | exit | entrance |
| Temp [° C.] | 360 | 360 | 360 | 60 |
| Enthalpy [kJ/kg] | 2481.7 | 1762.1 | 1762.1 | 248.3 |
| Enthalpy [kWh/t] | 689.4 | 489.5 | 489 | 69.0 |
| Thermal load [kWh] | 200 | | 420.5 | |
| VP-1 process | exit | entrance | exit | entrance |
| Temp [° C.] | 400 | 370 | 380 | 304 |
| Enthalpy [kJ/kg] | 799.8 | 7233 | 748.5 | 564.9 |
| Enthalpy [kWh/t] | 222.2 | 200.9 | 200.9 | 156.9 |
| VP-1 flow Rate [t/h] | 9.4 | | 9.4 | |
| Thermal load [kWh] | 200 | | 421 | |
| PCM composition | NaOH (73.2%) + NaCl (26.8%) | | | |
| PCM Temp [° C.] | 370 | | | |
| Latent heat [kWh/t] | 102.8 | | | |
| PCM weight [ton] | 2 | | 4.1 | |

The invention claimed is:

1. A system for transferring and storing heat comprising:
a first heat exchange and storage apparatus including:
a first closed chamber;
a heat output device, through which a working medium passes, having heat output device surfaces that pass through and are exposed within the first closed chamber;
a heat input device that carries a heat transfer fluid (HTF) from a heat source or collector external to said first closed chamber and injects a vapor form of the heat transfer fluid through a valve into the first closed chamber;
a thermal storage medium located within the first closed chamber and having defined thermal storage surfaces, wherein said thermal storage medium comprises a solid-liquid phase change material;
a heat exchange system configured to deliver a heat exchange medium from a storage reservoir external to said first closed chamber to the thermal storage surfaces inside said first closed chamber;
wherein, during thermal storage, the first heat exchange and storage apparatus is configured to contact the vapor form of the HTF produced by said heat source or collector with the thermal storage surfaces and condense the HTF on said thermal storage surfaces delivering latent heat from the vapor form to the thermal storage medium via phase change from vapor to liquid HTF and to recirculate the liquid HTF back to the heat source or collector where said HTF is converted back to a vapor form; and
wherein, during thermal release, the first heat exchange and storage apparatus is configured to deliver a liquid phase heat exchange medium from said storage reservoir to the thermal storage surfaces which convert the heat exchange medium to a vapor phase that contacts the surfaces of said heat output device that are exposed within the first closed chamber and heats the working medium in said heat output device while condensing back to a liquid phase heat exchange medium and to recirculate said liquid heat exchange medium back to said storage reservoir.

2. The system of claim 1 wherein the thermal storage medium comprises a high temperature solid-liquid phase change material.

3. The system of claim 2, wherein the high temperature solid-liquid phase change material comprises a material selected from the group consisting of $MnCl_2+NaCl+KCl$, $LiCO_3+K_2CO_3+NaCO_3$, $MgCL_2+KCl+NaCl$, $MgCL_2+KCl+NaCl$, $KCl+MnCl_2+NaCl$, $MgCL_2+NaCl+KCl$, $KOH$, $NaOH+NaCl$, $KCl+MnCL_2+NaCl$, $KCl+FeCL_2$, $KNO_3$, $NaOH+NaCl+Na_2CO_3$, $NaOH$, $KNO_3+KCl$, $NaNO_3+Na_2CO_3$, $NaNO_3$, $NaNO_3+NaF$, $NaCl+NaNO_3$, $NaOH+NaCl+Na_2CO_3$, $NaCl+NaNO_3$, $NaNO_3+Na_2SO_4$, $NaNO_3+Na_2SO_4$, $NaOH+NaNO_4$, $NaOH+NaCl+Na_2CO_3$, $NaCl+NaF+NaNO_3$, $NaNO_3+NaCl+Na_2SO_4$, $Na_2CO_3+NaOH$, $NaOH+NaCl+Na_2CO_3$, $NO_3+NaOH$, $KCl+ZnCl_2$, $NaNO_3+NaOH$, $NaNO_3+NaOH$, $NaNO_3+NaOH$, $NaOH+NaCl+NaNO_3$, $NaNO_3+NaCl+NaOH$, $NaOH+NaNO_3$, and $NaOH+NaNO_3$.

4. The system of claim 1 wherein the thermal storage medium comprises a low temperature solid-liquid phase change material.

5. The system of claim 4 wherein the low temperature solid-liquid phase-change material is a hydrous salt, a paraffin, or a fatty acid.

6. The system of claim 4 wherein the low temperature solid-liquid phase change material is selected from the group of $LiNO_3*3H_2O$, $Na_2SO_4*10H_2O$, $Na_2CO_3*10H_2O$, $Na_2HPO_4*10H_2O$, $Na_2S_2O_3*5H_2O$, $Na(CH_3COO)*3H_2O$, $Na_2P_2O_4*10H_2O$, 50% $Na(CH_3COO)*3H_2O$+50% $HCONH_2$, $Ba(OH)2i*8H_2O$, lauric acid, tetradecanoic acid, cetylic acid, and stearic acid.

7. The system of claim 1 wherein the heat transfer fluid is selected from the group of water, synthetic oil, ionic fluid, or molten salt.

8. The system of claim 1 wherein the heat transfer fluid is a high-boiling substance.

9. The system of claim 8 wherein the high-boiling substance is selected from the group of N-Octadecane, N-Pentadecylcyclopentane, and 1-Eicosanol.

10. The system of claim 1 wherein the heat transfer fluid is a low-boiling substance.

11. The system of claim 10 wherein the low-boiling substance is selected from the group of chloroform, methanol, acetyl chloride, cyclopentane, propionaldehyde, n-propyl amine, and 2,3-dimethyl-1-butene.

12. The system of claim 1 wherein the heat transfer fluid is a mid-boiling substance.

13. The system of claim 12 wherein the mid-boiling substance is selected from the group consisting of O-ethylphenol, ethyl benzoate, 1,2,3,4-tetrahydronaphthalene n-hexylcyclopentane, 1-dodecene, and VP-1 heat transfer oil.

14. The system of claim 1 further comprising:
a second heat exchange and storage apparatus including:
a second closed chamber coupled to the first closed chamber, wherein the heat transfer fluid is transferred to the second closed chamber prior to being recirculated back to the heat source or collector;
a second heat output device, through which a working medium/fluid passes, having heat output device surfaces that pass through and are exposed within the second closed chamber;
a second thermal storage medium located within the second closed chamber and having second defined thermal storage surfaces;
wherein the vapor form of the HTF contacts the second thermal storage surfaces and condenses thereon, delivering latent heat from the vapor form to the thermal storage medium via phase change from vapor to liquid;
wherein the heat transfer fluid that is condensed into liquid form in the second closed chamber is recirculated out of the second closed chamber back to the heat source or collector; and
a second heat exchange system that delivers a heat exchange medium/fluid to the thermal storage surfaces.

15. The system of claim 14 further comprising a third heat exchange and storage apparatus.

16. The system of claim 14 wherein the thermal storage medium comprises a first solid-liquid phase change material and the second thermal storage medium comprises a second solid-liquid phase change material.

17. The system of claim 16 wherein a melting point of the first solid-liquid phase change material is higher than a melting point of the second solid-liquid phase change material.

18. The system of claim 16 wherein a melting point of the first solid-liquid phase change material is the same as a melting point of the second solid-liquid phase change material.

19. The system of claim 1 wherein the working medium is water or ammonia.

20. The system of claim 1, wherein the thermal storage medium comprises a plurality of secondary containers each containing the solid-liquid phase change material.

21. The system of claim 20 wherein the plurality of secondary containers are positioned on a set of layered shelves with voids among the plurality of secondary containers.

22. The system of claim 21 wherein the heat exchange system further comprises a channel from a bottom of the first closed chamber to a top of the first closed chamber, such that the channel allows the heat exchange medium to travel to the top of the plurality of secondary containers without passing through the voids when the heat exchange medium is vaporized.

23. The system of claim 22 wherein the heat exchange system further comprises a circulation pump in fluid communication with a heat exchange medium reservoir.

24. The system of claim 23 wherein the heat exchange system further comprises a liquid spread device disposed at the top of the chamber.

25. The system of claim 24 wherein the liquid spread device receives heat exchange medium from the reservoir by way of the circulation pump, and the liquid spread device spreads the heat exchange medium onto high temperature surfaces of the plurality of secondary containers, thereby vaporizing the heat exchange medium.

26. The system of claim 25 wherein the heat exchange medium transfers latent heat from the vaporized heat exchange medium to the working medium by condensation on the heat output device surface at the top of the first closed chamber.

27. The system of claim 26 wherein the circulation pump is further in fluid communication with the bottom of the chamber, such that condensing heat exchange medium drops to the bottom of the chamber and is circulated to the top of the chamber by the circulation pump.

28. The system of claim 1, wherein the working medium is water.

29. The system of claim 1, wherein the heat exchange medium is the same material as the heat transfer fluid.

30. The system of claim 1, wherein the heat exchange medium is the same material type as the working medium.

31. The system of claim 1, wherein the heat exchange system that delivers the heat exchange medium to the thermal storage surfaces is a showering system that continuously supplies a liquid phase portion of the heat exchange medium to the thermal storage surfaces, and transfers heat to the working medium.

32. The system of claim 1 wherein the heat exchange system operates to deliver heat to the working medium when there is no heat transfer fluid transferring into the heat input device.

33. The system of claim 1 wherein the heat exchange and storage apparatus further comprises an inert gas pressure regulator coupled to the first closed chamber.

34. The system of claim 1 wherein the heat exchange and storage apparatus further comprises a reservoir and a circulating pump coupled to the chamber.

35. The system of claim 26 wherein the temperature in the first closed chamber is controlled using an inert gas pressure regulator in conjunction with a flow rate control that controls the reservoir, the circulating pump, and the pressure regulator to maintain a chamber vapor pressure and a chamber temperature for a target liquid phase volume for constant heat exchange.

36. The system of claim 1 wherein the thermal storage surfaces are made with an elastic metal shell so that when solid phase material changes to liquid phase materials, the elastic metal shell adapts to volume changes of the thermal storage medium.

37. The system of claim 36, wherein the thermal storage surfaces comprise grooves on the elastic metal shell that further accommodate volume changes.

38. The system of claim 1, wherein the thermal storage medium includes solid-to-liquid phase change material in containers.

39. A method of transferring and storing heat comprising:
providing the first heat exchange and storage apparatus according to claim 1, and:
operating said first heat exchange and storage apparatus during thermal storage to contact the vapor form of the HTF produced by said heat source or collector with the thermal storage surfaces and condense the HTF on said thermal storage surfaces delivering latent heat from the vapor form to the thermal storage medium via phase change from vapor to liquid HTF and to recirculate the liquid HTF back to the heat source or collector where said HTF is converted back to a vapor form; or
operating said first heat exchange and storage apparatus during thermal release to deliver a liquid phase heat exchange medium from said storage reservoir to the thermal storage surfaces and convert the heat exchange medium to a vapor phase that contacts the surfaces of said heat output device that are exposed within the first closed chamber and heat the working medium in said heat output device while condensing back to a liquid phase heat exchange medium and to recirculate said liquid heat exchange medium back to said storage reservoir.

40. The method of claim 39, wherein the heat transfer fluid is VP-1, wherein the VP-1 material is heated to about 400 degrees Celsius by the heat source or collector, and the chamber is maintained at a temperature of about 380 degrees Celsius.

41. The method of claim 39 further comprising: controlling a temperature of the first closed chamber, a pressure of the first closed chamber, or both the temperature and pressure of the first closed chamber to cause the vapor phase heat transfer fluid to condense and thereby transfer latent heat of the vapor phase heat transfer fluid to the thermal storage material.

* * * * *